(12) United States Patent
Allison et al.

(10) Patent No.: US 7,097,549 B2
(45) Date of Patent: *Aug. 29, 2006

(54) POLISHING PAD

(75) Inventors: William C. Allison, Murrysville, PA (US); Robert G. Swisher, Pittsburgh, PA (US); Alan E. Wang, Gibsonia, PA (US)

(73) Assignee: PPG Industries Ohio, Inc., Cleveland, OH (US)

( * ) Notice: Subject to any disclaimer, the term of this patent is extended or adjusted under 35 U.S.C. 154(b) by 351 days.

This patent is subject to a terminal disclaimer.

(21) Appl. No.: 10/317,982

(22) Filed: Dec. 13, 2002

(65) Prior Publication Data

US 2003/0217517 A1    Nov. 27, 2003

Related U.S. Application Data

(60) Provisional application No. 60/343,324, filed on Dec. 20, 2001.

(51) Int. Cl.
  *B24D 11/00*  (2006.01)
  *B24D 3/00*   (2006.01)
  *B24D 3/28*   (2006.01)
  *B24D 18/00*  (2006.01)

(52) U.S. Cl. ............... 451/526; 451/533; 51/298

(58) Field of Classification Search ......... 451/526, 451/527, 530, 532, 41, 28; 51/295, 296, 51/298, 307, 309
See application file for complete search history.

(56) References Cited

U.S. PATENT DOCUMENTS

| | | | |
|---|---|---|---|
| 5,257,478 A | 11/1993 | Hyde et al. | 51/131.3 |
| 5,578,362 A | 11/1996 | Reinhardt et al. | 428/147 |
| 5,693,738 A | 12/1997 | Okazaki et al. | 528/51 |
| 5,900,164 A | 5/1999 | Budinger et al. | 216/88 |
| 6,069,080 A | 5/2000 | James et al. | 438/691 |
| 6,099,954 A | 8/2000 | Urbanavage et al. | 428/314.2 |
| 6,106,754 A | 8/2000 | Cook et al. | 264/113 |
| 6,231,434 B1 | 5/2001 | Cook et al. | 451/527 |
| 6,337,281 B1 | 1/2002 | James et al. | 438/693 |
| 6,419,556 B1 | 7/2002 | Urbanavage et al. | 451/41 |

(Continued)

FOREIGN PATENT DOCUMENTS

EP    1164559 A1    12/2001

(Continued)

OTHER PUBLICATIONS

*Ullman's Encyclopedia of Industrial Chemistry*, Fifth Ed., 1992, vol. A21, pp. 673-674.

(Continued)

Primary Examiner—Lee D. Wilson
(74) Attorney, Agent, or Firm—Carol A. Marmo

(57) ABSTRACT

A polishing pad is described as comprising, (a) particulate polymer which can be chosen from particulate thermoplastic polymer (e.g., particulate thermoplastic polyurethane), particulate crosslinked polymer (e.g., particulate crosslinked polyurethane and/or particulate crosslinked polyepoxide) and mixtures thereof; and (b) organic polymer binder (e.g., polyurethane binder and/or polyepoxide binder), which can bind the particulate polymer together, wherein said organic polymer binder can be prepared in-situ. The particulate polymer and organic polymer binder can be distributed substantially across the work surface the polishing pad, and the pad can have a percent pore volume of from 2 percent by volume to 50 percent by volume, based on the total volume of said polishing pad.

28 Claims, 1 Drawing Sheet

U.S. PATENT DOCUMENTS

Figure 1:
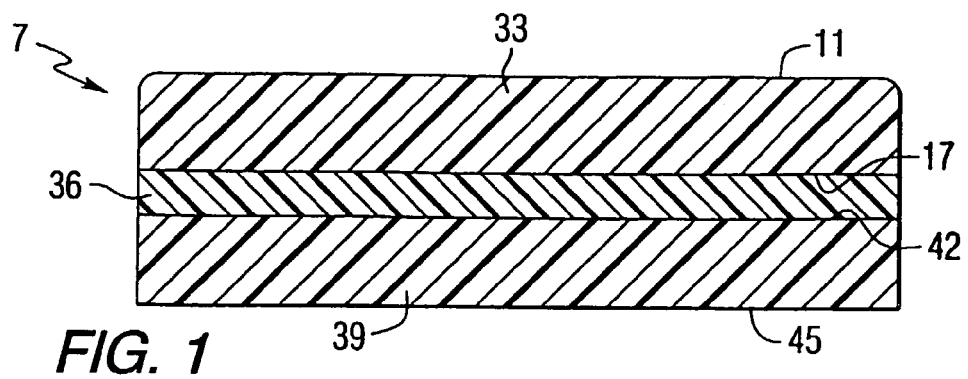

| | | | |
|---|---|---|---|
| 6,439,989 B1 | 8/2002 | Reinhardt et al. | 451/527 |
| 6,477,926 B1* | 11/2002 | Swisher et al. | 451/526 |
| 6,905,402 B1* | 6/2005 | Allison et al. | 451/533 |
| 2001/0024940 A1 | 9/2001 | Cook et al. | 451/526 |
| 2002/0010232 A1 | 1/2002 | Ogawa et al. | 523/448 |
| 2003/0217517 A1* | 11/2003 | Allison et al. | 51/298 |
| 2004/0102137 A1* | 5/2004 | Allison et al. | 451/28 |

FOREIGN PATENT DOCUMENTS

| | | |
|---|---|---|
| WO | WO 96/15887 | 5/1996 |
| WO | WO 02/22701 A2 | 3/2002 |

OTHER PUBLICATIONS

George Odian, "Principles of Polymerization," McGraw-Hill, Inc. 1970, pp. 16-19 and 94-99.

U.S. Appl. No. 60/343,324, Polishing Pad, filed Dec. 20, 2001.

ASTM D2240-02b, "Standard Test Method for Rubber Property—Durometer Hardness," Jan. 2003, pp. 1-12.

ASTM D1622-88, "Standard Test Method for Apparent Density of Rigid Cellular Plastics," Jan. 1989, pp. 491-493.

ASTM D4284-92, "Standard Test Method for Determining Pore Volume Distribution of Catalysts by Mercury Intrusion Porosimetry," pp. 634-639.

* cited by examiner

POLISHING PAD

This application claims priority to provisional application Ser. No. 60/343,324, filed Dec. 20, 2001.

The present invention relates to a polishing pad. In particular, the polishing pad of the present invention can be porous and, can comprise particulate polymer and an organic polymer binder. The polishing pad according to the present invention is useful for polishing articles, and is especially useful for chemical mechanical polishing or planarization of microelectronic and optical electronic devices such as but not limited to semiconductor wafers.

The polishing or planarization of a rough surface of an article such as a microelectronic device, to a substantially smooth surface generally involves rubbing the rough surface with the work surface of a polishing pad using a controlled and repetitive motion. A polishing fluid can be interposed between the rough surface of the article that is to be polished and the work surface of the polishing pad.

The fabrication of a microelectronic device can comprise the formation of a plurality of integrated circuits on a semiconductor substrate. The composition of the substrate can include silicon or gallium arsenide. The integrated circuits generally can be formed by a series of process steps in which patterned layers of materials, such as conductive, insulating and semiconducting materials, are formed on the substrate. In order to maximize the density of integrated circuits per wafer, it is desirable to have a planar polished substrate at various stages throughout the production process. As such, production of a microelectronic device typically involves at least one polishing step and can often involve a plurality of polishing steps, which can result in the use of more than one polishing pad.

The polishing step can include rotating the polishing pad and the semiconductor substrate against each other in the presence of a polishing fluid. The polishing fluid can be mildly alkaline and can optionally contain an abrasive particulate material such as but not limited to particulate cerium oxide, particulate alumina, or particulate silica. The polishing fluid can facilitate the removal and transport of abraded material off and away from the rough surface of the article.

Polishing pad characteristics such as pore volume and pore size can vary from pad-to-pad and throughout the operating lifetime of a particular pad. Variations in the polishing characteristics of the pads can result in inadequately polished and planarized substrates which can be unsuitable for fabricating semiconductor wafers. Thus, it is desirable to develop a polishing pad that exhibits reduced pad-to-pad variation in polishing and planarization characteristics. It is further desirable to develop a polishing pad that exhibits reduced variations in polishing and planarization characteristics throughout the operating lifetime of the pad.

In accordance with the present invention, there is provided a polishing pad comprising: (a) particulate polymer chosen from thermoplastic particulate polymers, crosslinked particulate polymers, particulate polymers comprised of interpenetrating polymer networks, and mixtures thereof; and (b) an organic polymer binder chosen from thermoplastic organic polymer binders, substantially crosslinked organic polymer binders, interpenetrating polymer networks, and mixtures thereof.

The present invention further includes a polishing pad comprising particulate polymer and an organic polymer binder wherein said binder is formed in-situ. Moreover, the present invention includes a polishing pad comprising particulate polymer and an organic polymer binder wherein there is no sintering of particles in said particulate polymer.

As used herein and in the claims, the term "substantially uniformly across working surface of said pad" refers to the distribution of the particulate polymer and organic polymer binder such that the variation in physical characteristics of the pad is reduced, and the uniformity of the physical characteristics of the pad is enhanced.

As used herein and in the claims, the terms "in-situ preparation of the binder", "in-situ polymerization of the binder" "in-situ formation of the binder", and similar terminology, refer to preparing, polymerizing and/or forming the organic polymer binder of the present invention in the presence of the particulate polymer. In a non-limiting embodiment, the molecules of a binder precursor can chemically react with each other to form the organic polymer binder while the precursor is in the presence of the particulate polymer. In another non-limiting embodiment, more than one binder precursor can be used and the molecules of one precursor can chemically react with the molecules of another precursor to form the organic polymer binder while in the presence of the particulate polymer.

Suitable organic binder precursors for use in the present invention can be selected from a wide variety known to skilled artisans. Non-limiting examples can include monomers, prepolymers, resins and mixtures thereof. In a non-limiting embodiment, the organic binder precursor can comprise catalysts, crosslinking agents, curing agents, and other conventional additives that are known in the art.

In a non-limiting embodiment, the percent pore volume of the polishing pad of the present invention can be calculated using the following equation, "100×(density of the pad)×(pore volume of the pad)". The density (e.g., grams per cubic centimeter) can be determined in accordance with American Standard Test Method (ASTM) No. D 1622-88. The pore volume (e.g., cubic centimeters per gram) can be determined by means of a mercury porosimetry method in accordance with ASTM D 4284-88, using an Autopore III mercury porosimeter from Micromeritics.

It is noted that, as used in this specification and the appended claims, the singular forms "a," "an," and "the" include plural referents unless expressly and unequivocally limited to one referent.

For the purposes of this specification, unless otherwise indicated, all numbers expressing quantities of ingredients, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements.

Figure 2:
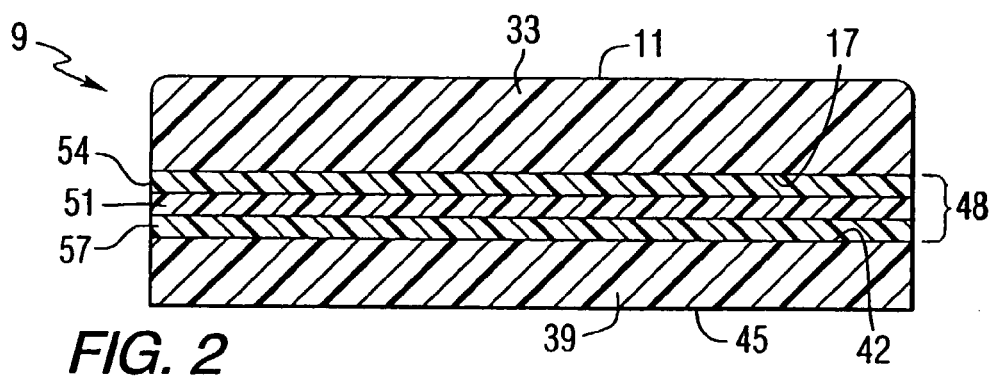
Figure 3:
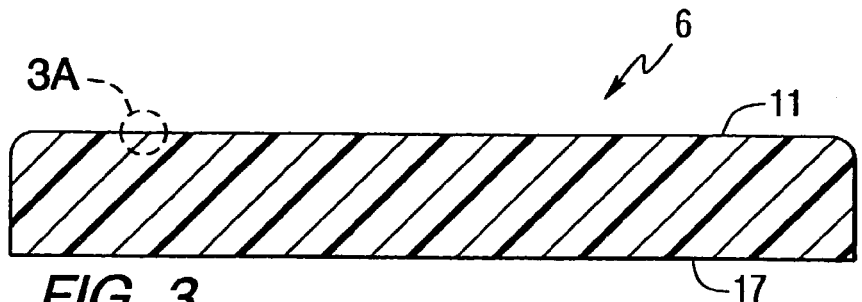
Figure 3A:
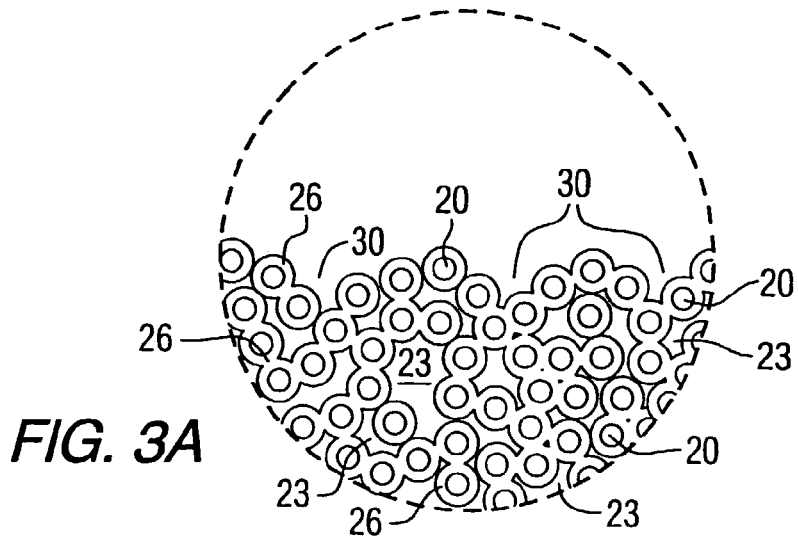

FIG. 1 is a sectional representation of a polishing pad assembly according to the present invention;

FIG. 2 is a sectional representation of a polishing pad assembly according to the present invention, which is similar to that of FIG. 1 but in which the adhesive means is an adhesive assembly; and FIG. 3 is a sectional representation of a polishing pad according the present invention, in which a portion of the pad, including a portion of the work surface of the pad, is shown in greater detail. FIGS. 1–3 are not to scale. In FIGS. 1–3, like numerals refer to the same structural components.

In a non-limiting embodiment, the polishing pad of the present invention can comprise particulate polymer and an organic polymer binder. The organic polymer binder can bind together the particulate polymer.

Non-limiting examples of suitable particulate polymer can include thermoplastic particulate polymers, crosslinked particulate polymers, and mixtures thereof. In a non-limiting embodiment, the particulate polymer can be chosen such that there is no sintering of the particles upon heating. As used herein and the claims, the term "no sintering" and related terms mean that there is minimal plastic flow at the boundary of the particulate polymer, and little to no coalescence between the particles of the particulate polymer in the polishing pad of the present invention.

In a non-limiting embodiment, when the particulate polymer of the pad comprises particulate thermoplastic polymer, the polishing pad can be prepared below the melting or sintering point of the particulate thermoplastic polymer. In another non-limiting embodiment, the particulate polymer can comprise particulate crosslinked polymer which can have sintering point, and thus can be unsinterable.

The polymer comprising the particulate polymer for use in the present invention can be prepared by various methods that are known to the skilled artisan. In alternate non-limiting embodiments, the polymer can be formed by a condensation reaction, or a free radical initiated reaction, or combinations thereof. In one non-limiting embodiment, the polymer can include a polyurethane formed by condensation polymerization of an isocyanate functional polyurethane prepolymer with a polyamine. In another non-limiting embodiment, the polymer can include a polyurethane-acrylate formed by free radical polymerization of a urethane-diacrylate in the presence of free radical initiator. In a further non-limiting embodiment, the polymer can include an interpenetrating polymer network formed by stepwise or simultaneous condensation and free radical polymerization reactions. As used herein and the claims, the term "interpenetrating polymer network" (IPN) refers to a combination of two polymers both in network form, at least one of which is synthesized or crosslinked in the immediate presence of the other. Unlike chemical blends, there are no induced covalent bonds between the two polymers. Thus, in addition to mechanical blending and copolymerization, IPNs represent another mechanism by which different polymers can be physically combined.

The particulate polymer can be prepared by various methods that are known to the skilled artisan. In a non-limiting embodiment, bulk polymers can be cryogenically ground and classified into desired particle size ranges. In another non-limiting embodiment, the particulate polymer can be prepared directly by reacting a two-component composition comprising a polyisocyanate and an OH-containing material, in the presence of a liquid medium. In a further non-limiting embodiment, said liquid medium is heated and agitated. In another non-limiting embodiment, the liquid medium (such as but not limited to an aqueous medium) can be chosen such that the two-component composition can be substantially insoluble in the medium. In alternate non-limiting embodiments, the shape of the particulate polymer can be regular or irregular, and can include but is not limited to the following shapes: spherical, disk, flake and combinations or mixtures thereof.

In alternate non-limiting embodiments, the particulate polymer can have an average particle size of at least 20 microns, or at least 50 microns, or at least 100 microns. In alternate non-limiting embodiments, the particulate polymer can have an average particle size of less than 500 microns, or less than 400 microns, or less than 300 microns. The average particle size of the particulate polymer can be determined by methods that are well known to the skilled artisan. In a non-limiting embodiments the average particle size of the particulate polymer can be determined using light scattering techniques, such as a Coulter LS particle size analyzer which is manufactured and commercially available from Beckman Coulter Incorporated. As used herein and in the claims, "particle size" refers to the diameter of the particle based on volume percent as determined by light scattering using a Coulter Counter LS particle size analyzer. In this light scattering technique, the diameter is determined from a hydrodynamic radius of gyration regardless of the actual shape of the particle. The "average" particle size is the average diameter of the particle based on volume percent.

In a non-limiting embodiment, the particulate polymer can be substantially solid. As used herein and in the claims, and with reference to the particulate polymer of the polishing pad, the term "substantially solid" means that the particulate polymer is not hollow, for example, the particulate polymer is not in the form of hollow microcapsules. In a non-limiting embodiment, the substantially solid particulate polymer can contain entrapped gas wherein the entrapped gas bubbles can have an average particle size of less than on-half of the average particle size of the particulate polymer.

Suitable particulate polymers can be chosen from a wide variety of polymers that are well known to the skilled artisan, and can include but are not limited to polyvinylchloride, polyvinylfluoride, polyethylene, polypropylene, nylon, polycarbonate, polyester, poly(meth)acrylate, polyether, polyamide, polyurethane, polyepoxide, polystyrene, polyimide (e.g., polyetherimide), polysulfone and mixtures thereof. As used herein and in the claims, the term "(meth)acrylate" refers to acrylates which can include urethane acrylates, methacrylates and combinations of acrylates and methacrylates. In alternate non-limiting embodiments, polyurethanes can have backbone linkages chosen from urethane linkages (—NH—C(O)—O—), urea linkages (—NH—C(O)—NH— or —NH—C(O)—N(R)— wherein R can be hydrogen, an aliphatic, cycloaliphatic or aromatic group), thio-carbamate linkages (—NH—C(O)—S—), and combinations thereof. In alternate non-limiting embodiments, polyepoxides can have backbone linkages chosen from ether linkages, thio-ether linkages, ester linkages, amino linkages and combinations thereof. In alternate non-limiting embodiments, the particulate polymer can be chosen from poly (meth)acrylate, polyurethane, polyepoxide and mixtures thereof.

Particulate polyurethanes can be prepared by various methods that are known to the skilled artisan. In a non-limiting embodiment, the particulate polyurethane can be prepared from a composition comprising an isocyanate functional material which can have at least two isocyanate groups, and/or a capped isocyanate reactant having at least two capped isocyanate groups; and a hydrogen functional material which can have at least two hydrogen groups that are reactive with the isocyanate groups of the isocyanate material.

In a non-limiting embodiment, the isocyanate and hydrogen materials can be mixed together and polymerized or cured to form a bulk polyurethane, which can then be ground (e.g., cryogenically ground), and optionally classified. In another non-limiting embodiment, the particulate polyurethane can be formed by mixing the isocyanate and hydrogen materials together, slowly pouring the mixture into heated deionized water under agitation (optionally in the presence of an organic cosolvent and/or surfactant), isolating the formed particulate material (e.g., by filtration), drying the isolated particulate material, and optionally classifying the dried particulate polyurethane. In a further non-limiting embodiment, the isocyanate and hydrogen materials can be mixed together in the presence of an organic solvent. The organic solvent can be chosen from a wide variety known in the art. In an embodiment, the organic solvent can include alcohols, water-insoluble ethers, branched and straight hydrocarbons, ketones, toluene, xylene and mixtures thereof In a non-limiting embodiment, the organic solvent can be methyl isobutyl ketone.

In a non-limiting embodiment, the isocyanate functional material can be chosen from isocyanate functional monomers, isocyanate functional prepolymers and combinations thereof. Non-limiting examples of suitable isocyanate monomers can include but are not limited to aliphatic polyisocyanates; ethylenically unsaturated polyisocyanates; alicyclic polyisocyanates; aromatic polyisocyanates wherein the isocyanate groups are not bonded directly to the aromatic ring, for example, α,α'-xylene diisocyanate; aromatic polyisocyanates wherein the isocyanate groups are bonded directly to the aromatic ring, for example., benzene diisocyanate; halogenated, alkylated, alkoxylated, nitrated, carbodiimide modified, urea modified and biuret modified derivatives of these polyisocyanates; and dimerized and trimerized products of these polyisocyanates.

Non-limiting examples of aliphatic polyisocyanates can include but are not limited to ethylene diisocyanate, trimethylene diisocyanate, tetramethylene diisocyanate, hexamethylene diisocyanate, octamethylene diisocyanate, nonamethylene diisocyanate, 2,2'-dimethylpentane diisocyanate, 2,2,4-trimethylhexane diisocyanate, decamethylene diisocyanate, 2,4,4,-trimethylhexamethylene diisocyanate, 1,6,1-undecanetriisocyanate, 1,3,6-hexamethylene triisocyanate, 1,8-diisocyanato-4-(isocyanatomethyl)octane, 2,5,7-trimethyl-1,8-diisocyanato-5-(isocyanatomethyl)octane, bis(isocyanatoethyl)-carbonate, bis(isocyanatoethyl)ether, 2-isocyanatopropyl-2,6-diisocyanatohexanoate, lysinediisocyanate methyl ester, lysinetriisocyanate methyl ester and mixtures thereof.

Non-limiting examples of suitable ethylenically unsaturated polyisocyanates can include, but are not limited to, butene diisocyanate and 1,3-butadiene-1,4-diisocyanate. Non-limiting examples of suitable alicyclic polyisocyanates can include, but are not limited to, isophorone diisocyanate, cyclohexane diisocyanate, methylcyclohexane diisocyanate, bis(isocyanatomethyl)cyclohexane, bis(isocyanatocyclohexyl)methane, bis(isocyanatocyclohexyl)-2,2-propane, bis(isocyanatocyclohexyl)-1,2-ethane, 2-isocyanatomethyl-3-(3-isocyanatopropyl)-5-isocyanatomethyl-bicyclo[2.2.1]-heptane, 2-isocyanatomethyl-3-(3-isocyanatopropyl)-6-isocyanatomethyl-bicyclo[2.2.1]-heptane, 2-isocyanatomethyl-2-(3-isocyanatopropyl)-5-isocyanatomethyl-bicyclo[2.2.1]-heptane, 2-isocyanatomethyl-2-(3-isocyanatopropyl)-6-isocyanatomethyl-bicyclo[2.2.1]-heptane, 2-isocyanatomethyl-3-(3-isocyanatopropyl)-6-(2-isocyanatoethyl)-bicyclo[2.2.1]-heptane, 2-isocyanatomethyl-2-(3-isocyanatopropyl)-5-(2-isocyanatoethyl)-bicyclo[2.2.1]-heptane, 2-isocyanatomethyl-2-(3-isocyanatopropyl)-6-(2-isocyanatoethyl)-bicyclo[2.2.1]-heptane and mixtures thereof.

Non-limiting examples of aromatic polyisocyanates wherein the isocyanate groups are not bonded directly to the aromatic ring can include but are not limited to bis(isocyanatoethyl)benzene, α,α,α',α'-tetramethylxylene diisocyanate, 1,3-bis(1-isocyanato-1-methylethyl)benzene, bis(isocyanatobutyl)benzene, bis(isocyanatomethyl)naphthalene, bis(isocyanatomethyl)diphenyl ether, bis(isocyanatoethyl)phthalate, mesitylene triisocyanate, 2,5-di(isocyanatomethyl)furan and mixtures thereof.

Non-limiting examples of suitable aromatic polyisocyanates, having isocyanate groups bonded directly to the aromatic ring can include but are not limited to phenylene diisocyanate, ethylphenylene diisocyanate, isopropylphenylene diisocyanate, dimethylphenylene diisocyanate, diethylphenylene diisocyanate, diisopropylphenylene diisocyanate, trimethylbenzene triisocyanate, benzene triisocyanate, naphthalene diisocyanate, methylnaphthalene diisocyanate, biphenyl diisocyanate, ortho-tolidine diisocyanate, 4,4'-diphenylmethane diisocyanate, bis(3-methyl-4-isocyanatophenyl)methane, bis(isocyanatophenyl)ethylene, 3,3'-dimethoxy-biphenyl-4,4'-diisocyanate, triphenylmethane triisocyanate, polymeric 4,4'-diphenylmethane diisocyanate, naphthalene triisocyanate, diphenylmethane-2,4,4'-triisocyanate, 4-methyldiphenylmethane-3,5,2',4',6'-pentaisocyanate, diphenylether diisocyanate, bis(isocyanatophenylether)ethyleneglycol, bis(isocyanatophenylether)-1,3-propyleneglycol, benzophenone diisocyanate, carbazole diisocyanate, ethylcarbazole diisocyanate, dichlorocarbazole diisocyanate and mixtures thereof.

In a non-limiting embodiment of the present invention, the isocyanate functional material can be a polyisocyanate monomer having two isocyanate groups. Non-limiting examples of suitable polyisocyanate monomers having two isocyanate groups include but are not limited to α,α'-xylene diisocyanate, α,α,α',α'-tetramethylxylene diisocyanate, isophorone diisocyanate, bis(isocyanatocyclohexyl)methane, toluene diisocyanate, 4,4'-diphenylmethane diisocyanate and mixtures thereof.

In another non-limiting embodiment, the isocyanate functional material can comprise an isocyanate functional polyurethane prepolymer. Isocyanate functional polyurethane prepolymers can be prepared by various methods that are known to the skilled artisan. In a non-limiting embodiment, at least one polyol such as but not limited to a diol, and at least one isocyanate functional monomer such as but not limited to a diisocyanate monomer, can be reacted together to form a polyurethane prepolymer having at least two isocyanate groups. Non-limiting examples of suitable isocyanate functional monomers include the aforementioned isocyanate functional monomers.

Suitable isocyanate functional polyurethane prepolymers for use in the present invention can have molecular weights that vary within a wide range. In a non-limiting embodiment, the isocyanate functional polyurethane prepolymer can have a number average molecular weight (Mn) of from 500 to 15,000, or from 500 to 5000, as determined by gel permeation chromatography (GPC) using polystyrene standards.

Non-limiting examples of polyols that can be used to prepare the isocyanate functional polyurethane prepolymer include but are not limited to straight or branched chain alkane polyols, such as but not limited to 1,2-ethanediol, 1,3-propanediol, 1,2-propanediol, 1,4-butanediol, 1,3-butanediol, glycerol, neopentyl glycol, trimethylolethane, trimethylolpropane, di-trimethylolpropane, erythritol, pentaerythritol and di-pentaerythritol; polyalkylene glycols, such as but not limited to di-, tri- and tetraethylene glycol, and di-, tri- and tetrapropylene glycol; cyclic alkane polyols, such as but not limited to cyclopentanediol, cyclohexanediol, cyclohexanetriol, cyclohexanedimethanol, hydroxypropylcyclohexanol and cyclohexanediethanol; aromatic polyols, such as but not limited to dihydroxybenzene, benzenetriol, hydroxybenzyl alcohol and dihydroxytoluene; bisphenols, such as but not limited to 4,4'-isopropylidenediphenol; 4,4'-oxybisphenol, 4,4'-dihydroxybenzophenone, 4,4'-thiobisphenol, phenolphthlalein, bis(4-hydroxyphenyl) methane, 4,4'-(1,2-ethenediyl)bisphenol and 4,4'-sulfonylbisphenol; halogenated bisphenols, such as but not limited to 4,4'-isopropylidenebis(2,6-dibromophenol), 4,4'-isopropylidenebis(2,6-dichlorophenol) and 4,4'-isopropylidenebis(2, 3,5,6-tetrachlorophenol); alkoxylated bisphenols, such as but not limited to alkoxylated 4,4'-isopropylidenediphenol having from 1 to 70 alkoxy groups, such as but not limited to ethoxy, propoxy, α-butoxy and β-butoxy groups; and biscyclohexanols, which can be prepared by hydrogenating the corresponding bisphenols, such as but not limited to 4,4'-isopropylidene-biscyclohexanol, 4,4'-oxybiscyclohexanol, 4,4'-thiobiscyclohexanol and bis(4-hydroxycyclohexanol)methane.

Further non-limiting examples of suitable polyols for use in the present invention include but are not limited to higher polyalkylene glycols, such as but not limited to polyethylene glycols having a number average molecular weight (Mn) of from 200 to 2000; hydroxyl-bearing acrylics, such as but not limited to those formed from the copolymerization of (meth) acrylates and hydroxy functional (meth)acrylates, such as but not limited to methyl methacrylate and hydroxyethyl methacrylate copolymers;and hydroxy functional polyesters, such as but not limited to those formed from the reaction of diols, such as but not limited to butane diol, and diacids or diesters, such as but not limited to adipic acid or diethyl adipate. In another non-limiting embodiment, the polyol for use in the present invention can have a number average molecular weight (Mn) of from 200 to 2000.

In a further non-limiting embodiment, the isocyanate functional polyurethane prepolymer can be prepared by reacting a diisocyanate such as but not limited to toluene diisocyanate, with a polyalkylene glycol such as but not limited to poly(tetrahydrofuran).

In a non-limiting embodiment, the isocyanate functional polyurethane prepolymer can be prepared in the presence of a catalyst. Non-limiting examples of suitable catalysts can be chosen from a wide variety known in the art. Suitable catalysts can be those catalysts that are specific for the formation of urethane by reaction of isocyanate and OH-containing materials, and which have little tendency to accelerate side reactions leading to allophonate and isocyanate formation. In alternate non-limiting embodiments, the amount of catalyst used can be less than 5 percent by weight, or less than 3 percent by weight, or less than 1 percent by weight, based on the total weight of the polyol and isocyanate functional monomer.

Non-limiting examples of suitable catalysts can be chosen from the group of Lewis bases, Lewis acids and insertion catalysts as described in Ullmann's Encyclopedia of Industrial Chemistry, 5$^{th}$ Edition, 1992, Volume A21, pp. 673 to 674. In a non-limiting embodiment, the catalyst can be a stannous adduct of an organic acid, such as but not limited to stannous octoate, dibutyl tin dilaurate, dibutyl tin diacetate, dibutyl tin mercaptide, dibutyl tin dimaleate, dimethyl tin diacetate, dimethyl tin dilaurate, 1,4-diazabicyclo[2.2.2] octane, and mixtures thereof. In alternate non-limiting embodiments, the catalyst can be zinc octoate, bismuth, or ferric acetylacetonate.

Further non-limiting examples of suitable catalysts can include tertiary amines such as but not limited to triethylamine, triisopropylamine and N,N-dimethylbenzylamine. Such suitable tertiary amines are disclosed in U.S. Pat. No. 5,693,738 at column 10, lines 6–38, the disclosure of which is incorporated herein by reference.

In a non-limiting embodiment of present invention, the isocyanate functional material can include a capped isocyanate material having at least two capped isocyanate groups. The term "capped isocyanate material" as used herein and the claims, refers to a monomer or prepolymer having terminal and/or pendent capped isocyanate groups which can be converted to decapped (i.e., free) isocyanate groups and separate or free capping groups. The capping groups can be fugitive or nonfugitive. The term "nonfugitive capping groups" as used herein and the claims refers to a capping group which upon decapping or deblocking from the isocyanate group, remains substantially within a three dimensional network. The term "fugitive capping group" as used herein and the claims refers to a capping group, which upon decapping or deblocking from the isocyanate group, migrates substantially out of a three dimensional network.

In a non-limiting embodiment, the isocyanate groups of the capped isocyanate material can include the aforementioned examples of suitable isocyanate functional materials. Non-limiting examples of nonfugitive capping groups of the capped isocyanate material can include but are not limited to 1H-azoles, such as but not limited to 1H-imidazole, 1H-pyrazole, 3,5-dimethyl-1H-pyrazole, 1H-1,2,3-triazole, 1H-1,2,3-benzotriazole, 1H-1,2,4-triazole, 1H-5-methyl-1, 2,4-triazole and 1H-3-amino-1,2,4-triazole; lactams, such as but not limited to e-caprolactam and 2-pyrolidinone; morpholines such as but not limited to 3-aminopropyl morpholine; and N-hydroxy phthalimide.

Non-limiting examples of fugitive capping groups of the capped isocyanate material can include but are not limited to alcohols, such as but not limited to propanol, isopropanol, butanol, isobutanol, tert-butanol and hexanol; alkylene glycol monoalkyl ethers, such as but not limited to ethylene glycol monoalkyl ethers, such as but not limited to ethylene glycol monobutyl ether and ethylene glycol monohexyl ether, and propylene glycol monoalkyl ethers, such as but not limited to propylene glycol monomethyl ether; and ketoximes, such as but not limited to methyl ethyl ketoxime.

In a non-limiting embodiment, the capped isocyanate material can be included in the isocyanate functional material to improve the dimensional stability of the polishing pad prepared from the particulate polyurethane.

While not intending to be bound by any theory, it is believed that the inclusion of capped isocyanate material in the isocyanate functional material, can result in the formation of covalent bonds: (a) between at least a portion of the particulate polyurethane particles; and/or (b) between at least a portion of the particulate polyurethane and at least a portion of the organic polymer binder. In a non-limiting embodiment, the capped isocyanate material can be present in an amount such that the isocyanate functional material contains capped isocyanate groups in an amount of at least 5 mole percent, or at least 10 mole percent, or less than 40 mole percent, or less than 50 mole percent, based on the total molar equivalents of free isocyanate and capped isocyanate groups.

In a non-limiting embodiment, the isocyanate functional material can comprise a (meth)acrylate-modified polyfunctional isocyanate material having at least two (meth)acrylate-modified isocyanate groups. As used herein and the claims, the term "(meth)acrylate-modified isocyanate material" refers to the reaction product of a polyurethane prepolymer having terminal and/or pendent isocyanate groups, and an active hydrogen functional (meth)acrylate. In a further non-limiting embodiment, the (meth)acrylate groups can be subsequently polymerized using a polymerization initiator.

The polyfunctional isocyanate of the (meth)acrylate capped isocyanate material can include but is not limited to the aforementioned non-limiting examples of suitable isocyanate functional polyurethane prepolymers. Suitable hydrogen functional (meth)acrylates can include but are not limited to hydroxy or amino functional (meth)acrylates. Non-limiting examples of suitable hydroxy or amino functional (meth)acrylates include but are not limited to hydroxyethyl methacrylate, hydroxypropyl methacrylate, polypropylenegylcol monomethacrylate, propyleneglycol monomethacrylate, hydroxyethyl acrylate, hydroxypropyl acrylate, caprolactone acrylate, t-butyl aminoethyl methacrylate and mixtures thereof.

In a non-limiting embodiment, the (meth)acrylate-modified isocyanate material can be present in an amount of at least 5 weight percent, or at least 10 weight percent, or less than 60 weight percent, or less than 50 weight percent, based on the weight of the isocyanate functional material.

The hydrogen functional material for use in the present invention can be chosen from a wide variety of such materials known to the skilled artisan. In a non-limiting embodiment, the hydrogen functional material can have hydrogen groups chosen from hydroxyl, mercapto, primary amine, secondary amine and combinations thereof. Non-limiting examples of suitable hydrogen functional materials can include the aforementioned polyols.

In a non-limiting embodiment, the hydrogen functional material can include polyamines. Non-limiting examples of polyamines can include ethyleneamines such as but not limited to ethylenediamine (EDA), diethylenetriamine (DETA), triethylenetetramine (TETA), tetraethylenepentamine (TEPA), pentaethylenehexamine (PEHA), piperazine, such as but not limited to diethylenediamine (DEDA), and 2-amino-1-ethylpiperazine. Further non-limiting examples of suitable polyamines include one or more isomers of $C_1$–$C_3$ dialkyl toluenediamine, such as but not limited to 3,5-dimethyl-2,4-toluenediamine, 3,5-dimethyl-2,6-toluenediamine, 3,5-diethyl-2,4-toluenediamine, 3,5-diethyl-2,6-toluenediamine, 3,5-diisopropyl-2,4-toluenediamine, 3,5-diisopropyl-2,6-toluenediamine and mixtures thereof. In a non-limiting embodiment, the polyamine can be chosen from methylene dianiline, trimethyleneglycol di(para-aminobenzoate), and amine-terminated oligomers and prepolymers.

In a further non-limiting embodiment, suitable polyamines can be chosen from those based on 4,4'-methylene-bis(dialkylaniline), which may be represented by the following general formula I,

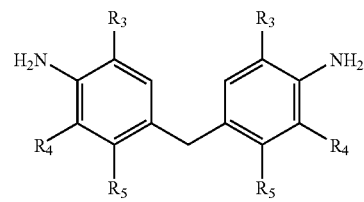

wherein $R_3$ and $R_4$ can each independently represent $C_1$–$C_3$ alkyl, and $R_5$ can be selected from hydrogen and halogen, such as but not limited to chlorine and bromine. Non-limiting examples of polyamines based on 4,4'-methylene-bis(dialkylaniline) can include but are not limited to 4,4'-methylene-bis(2,6-dimethylaniline), 4,4'-methylene-bis(2,6-diethylaniline), 4,4'-methylene-bis(2-ethyl-6-methylaniline), 4,4'-methylene-bis(2,6-diisopropylaniline), 4,4'-methylene-bis(2-isopropyl-6-methylaniline), 4,4'-methylene-bis(2,6-diethyl-3-chloroaniline) and mixtures thereof.

In a non-limiting embodiment, the isocyanate and hydrogen functional materials can further comprise a catalyst. Suitable urethane-forming catalysts can be used in the present invention to enhance the reaction of the polyurethane-forming materials. Suitable urethane-forming catalysts can be those catalysts that are specific for the formation of urethane by reaction of the NCO and OH-containing materials, and which have little tendency to accelerate side reactions leading to allophonate and isocyanate formation. Non-limiting examples of suitable catalysts can be chosen from the group of Lewis bases, Lewis acids and insertion catalysts as described in Ullmann's Encyclopedia of Industrial Chemistry, $5^{th}$ Edition, 1992, Volume A21, pp. 673 to 674. In a non-limiting embodiment, the catalyst can be a stannous salt of an organic acid, such as but not limited to stannous octoate, dibutyl tin dilaurate, dibutyl tin diacetate, dibutyl tin mercaptide, dibutyl tin dimaleate, dimethyl tin diacetate, dimethyl tin dilaurate, 1,4-diazabicyclo[2.2.2]octane, and mixtures thereof. In alternate non-limiting embodiments, the catalyst can be zinc octoate, bismuth, or ferric acetylacetonate.

Further non-limiting examples of suitable catalysts can include tertiary amines such as but not limited to triethylamine, triisopropylamine and N,N-dimethylbenzylamine. Such suitable tertiary amines are disclosed in U.S. Pat. No. 5,693,738 at column 10, lines 6–38, the disclosure of which is incorporated herein by reference.

In a non-limiting embodiment, the catalyst can be incorporated into the hydrogen functional material prior to it being combined with the isocyanate functional material. In alternate non-limiting embodiments, the amount of catalyst used can be less than 5 percent by weight, or less than 3 percent by weight, or less than 1 percent by weight, based on the total weight of the combined isocyanate and active hydrogen functional materials.

In alternate non-limiting embodiments, the molar equivalent ratio of isocyanate groups and optional capped isocyanate groups to active hydrogen groups can be typically from 0.5:1.0 to 1.5:1.0, e.g., from 0.7:1.0 to 1.3:1.0 or from 0.8:1.0 to 1.2:1.0.

In a non-limiting embodiment, suitable particulate polymers for use in the present invention can include particulate polyepoxides. A particulate polyepoxide can be prepared by various methods known in the art. In a non-limiting embodiment, the particulate polyepoxide can be the reaction product of an epoxide functional material which can have at least two epoxide groups; and a hydrogen functional material which can have at least two active hydrogen groups that are reactive with the epoxide groups of the epoxide material.

In a non-limiting embodiment, the epoxide functional material and the hydrogen functional material can be mixed together and polymerized or cured to form bulk polyepoxide, which then can be ground (e.g., cryogenically ground), and optionally classified. In another non-limiting embodiment, the particulate polyepoxide can be formed by mixing the epoxide functional and hydrogen functional materials together, slowly pouring the mixture into heated deionized water under agitation, isolating the formed particulate material (e.g., by filtration), drying the isolated particulate material, and optionally classifying the dried particulate polyepoxide.

In a non-limiting embodiment, suitable epoxide functional materials for use in the invention can include but are not limited to epoxide functional monomers, epoxide functional prepolymers and combinations thereof. Non-limiting examples of suitable epoxide functional monomers can include but are not limited to aliphatic polyepoxides, such as but not limited to 1,2,3,4-diepoxybutane, 1,2,7,8-diepoxyoctane; cycloaliphatic polyepoxides, such as but not limited to 1,2,4,5-diepoxycyclohexane, 1,2,5,6-diepoxycyclooctane, 7-oxa-bicyclo[4.1.0]heptane-3-carboxylic acid 7-oxa-bicyclo[4.1.0]hept-3-ylmethyl ester, 1,2-epoxy-4-oxiranylcyclohexane and 2,3-(epoxypropyl)cyclohexane; aromatic polyepoxides, such as but not, bis(4-hydroxyphenyl)methane diglycidyl ether; hydrogenated bisphenol A diepoxide and mixtures thereof. Epoxide functional monomers that may be used in the present invention are typically prepared from the reaction of a polyol and an epihalohydrin, for example, epichlorohydrin. Polyols that may be used to prepare epoxide functional monomers include those recited previously herein with regard to the preparation of the isocyanate functional prepolymer. A preferred class of epoxide functional monomers include those prepared from the reaction of a bisphenol, such as 4,4'-isopropylidenediphenol, and epichlorohydrin, such as, 4,4'-isopropylidenediphenol diglycidyl ether.

In a non-limiting embodiment, an epoxide functional prepolymer for use in the present invention can be prepared by reacting a polymeric polyol and epichlorohydrin. Non-limiting examples of suitable polymeric polyols can include but are not limited to polyalkylene glycols, such as, polyethylene glycol and polytetrahydrofuran; polyester polyols; polyurethane polyols; poly((meth)acrylate) polyols; and mixtures thereof.

The polymeric polyol can be prepared according to a variety of methods that are known to the skilled artisan. In a non-limiting embodiment of the present invention, the epoxide functional prepolymer can include an epoxy functional poly((meth)acrylate) polymer which can be prepared from a (meth)acrylate monomer and an epoxide functional radically polymerizable monomer (e.g., glycidyl (meth) acrylate). Suitable epoxide functional prepolymers can have a wide range of molecular weight. In alternate non-limiting embodiments, the molecular weight of the epoxide functional prepolymer can be from 500 to 15,000, or from 500 to 5000, as determined by gel permeation chromatography (GPC) using polystyrene standards.

The hydrogen functional material can contain hydrogen groups chosen from hydroxyl, mercapto, carboxylic acid, primary amine, secondary amine and combinations thereof. In alternate non-limiting embodiments, the hydrogen functional material can include but is not limited to the non-limiting examples of polyols recited previously herein. In further non-limiting embodiments, the hydrogen functional material for use in preparing the particulate polyepoxide can include but is not limited to the non-limiting examples of polyamines recited previously herein.

In alternate non-limiting embodiments, suitable polyamines can include polyamide prepolymers having at least two amine groups selected from primary amines, secondary amines and combinations thereof. Polyamide prepolymers can be prepared by a wide variety of methods known to a skilled artisan. In a non-limiting embodiment, a polyamide prepolymer having at least two amine groups can be prepared by reacting a polyamine, such as, dietheylenetriamine, and a polycarboxylic acid, such as, a difunctional carboxylic acid. Suitable non-limiting examples of polyamide prepolymers can include VERSAMID polyamide resins which are commercially available from Cognis Corporation, Coating & Inks Division.

Non-limiting examples of suitable polycarboxylic acids can include but are not limited to dodecanedioic acid, azelaic acid, adipic acid, 1,6-hexanedioic acid, succinic acid, pimelic acid, sebacic acid, maleic acid, citric acid, itaconic acid, aconitic acid, half-esters formed from reacting an acid anhydride with a polyol, and mixtures thereof. Further non-limiting examples can include carboxylic acid group-containing polymers such as acrylic polymers, polyesters, and polyurethanes; and oligomers such as ester group-containing oligomers; as well as fatty diacids.

In a non-limiting embodiment, a carboxylic acid functional acrylic material can be prepared by copolymerizing a methacrylic acid and/or acrylic acid monomer with an ethylenically unsaturated copolymerizable monomer, using techniques known to those skilled in the art. In another embodiment, a carboxylic acid functional acrylic can be prepared by reacting a hydroxy-functional acrylic polymer with a cyclic anhydride, using conventional art-recognized techniques.

Additional polycarboxylic acid reactants can include but are not limited to ester group-containing oligomers. Non-limiting examples of ester group-containing oligomers include half-esters formed by reacting polyols and 1,2-acid cyclic anhydrides, such as the half ester formed by reacting pentaerythritol and methylhexahydrophthalic anhydride, or acid functional polyesters derived from polyols and polyacids or anhydrides.

In a non-limiting embodiment, the epoxide and hydrogen functional materials can optionally comprise an epoxide ring opening catalyst. The catalyst can include those that are known to the skilled artisan. Non-limiting examples of suitable catalysts can be chosen from the group of Lewis bases, Lewis acids and insertion catalysts as described in Ullmann's Encyclopedia of Industrial Chemistry, $5^{th}$ Edition, 1992, Volume A21, pp. 673 to 674. In a non-limiting embodiment, the catalyst can be a stannous adduct of an organic acid, such as but not limited to stannous octoate, dibutyl tin dilaurate, dibutyl tin diacetate, dibutyl tin mercaptide, dibutyl tin dimaleate, dimethyl tin diacetate, dimethyl tin dilaurate, 1,4-diazabicyclo [2.2.2]octane, and mixtures thereof. In alternate non-limiting embodiments, the catalyst can be zinc octoate, bismuth, or ferric acetylacetonate.

Further non-limiting examples of suitable catalysts can include tertiary amines such as but not limited to triethylamine, triisopropylamine, tri-tertiarybutyl amine, tetrafluoroboric acid and N,N-dimethylbenzylamine. Such suitable tertiary amines are disclosed in U.S. Pat. No. 5,693,738 at column 10, lines 6–38, the disclosure of which is incorporated herein by reference.

In a non-limiting embodiment, the catalyst can be incorporated into the hydrogen functional material prior to it being combined with the epoxide functional material. In alternate non-limiting embodiments, the amount of catalyst used can be less than 5 percent by weight, or less than 3 percent by weight, or less than 1 percent by weight, based on the total weight of the combined isocyanate and active hydrogen functional materials.

The molar equivalents ratio of epoxide groups to hydrogen groups of the reactants used to prepare the particulate crosslinked polyepoxide is typically from 0.5:1.0 to 2.0:1.0, e.g., from 0.7:1.0 to 1.3:1.0 or from 0.8:1.0 to 1.2:1.0.

In non-limiting embodiments, the isocyanate and/or epoxide functional materials, and hydrogen functional materials can optionally comprise known conventional additives. Non-limiting examples of such additives can include but are not limited to heat stabilizers, antioxidants, mold release agents, static dyes, pigments, flexibilizing additives, such as but not limited to alkoxylated phenol benzoates and poly(alkylene glycol) dibenzoates, and surfactants, such as but not limited to ethylene oxide/propylene oxide block copolymeric surfactants. In alternate non-limiting embodiments, such additives can be present in an amount totaling less than 10 percent by weight, or less than 5 percent by weight, or less than 3 percent by weight, based on the total weight of the combined isocyanate and hydrogen functional materials, or epoxide and hydrogen functional materials.

In alternate non-limiting embodiments, the conventional additives can be added to the isocyanate functional material or the epoxide functional material, and/or the hydrogen functional material.

Non-limiting examples of suitable particulate polymers for use in the present invention can include particulate thermoplastic polymers, particulate crosslinked polymers and mixtures thereof. As used herein and in the claims, the term "thermoplastic polymer" refers to a polymeric material that is essentially not crosslinked and essentially does not form a three-dimensional network. As used herein and in the claims, the term "crosslinked polymer" refers to a polymer that is at least substantially crosslinked wherein said polymer has essentially a three-dimensional network. The structural shape of polymer molecules and the characterization of thermplastic or crosslinked polymers is known in the art. (See Principles of Polymerization, George Odian, McGraw-Hill, Inc., 1970, pages 16–19 and 94–99.) It is also known in the art that the presence of crosslinking and/or the extent of crosslinking can be controlled by the stoichiometry and/or curing used in preparing the polymer.

In a non-limiting embodiment, a thermoplastic polyurethane can be prepared by using the required stoichiometric amount (e.g. from 97% to 102%) of a curative such as but not limited to butane diol.

In a non-limiting embodiment, a crosslinked polyurethane can be prepared by using less than the stoichiometrically required amount of curative such that the urethane or urea linkages will react with remaining isocyanates. The curative can include but is not limited to glycol. In another non-limiting embodiment, the partial replacement of difunctional by trifunctional curatives or isocyanates will result in more thermally stable chemical crosslinks. In a further non-limiting embodiment, a trifunctional isocyanate commercially available from Rhone Poulenc under the tradename Tolonate HDT may be used to increase crosslinking within a polymer structure.

Non-limiting examples of thermoplastic polyurethane polymers for use in the present invention can include but are not limited to TEXIN® aliphatic polyether-based thermoplastic polyurethane resins, which are commercially available from Bayer Corporation. Non-limiting examples of thermoplastic poly(meth)acrylates can include but are not limited to ROHADON thermoplastic poly(meth)acrylate, which is commercially available from RÖHM America, Incorporated.

In a non-limiting embodiment, the particulate crosslinked polymer can be chosen such that there is essentially no sintering of the particles upon heating.

The amount of particulate polymer present in the polishing pad of the present invention can vary widely. In alternate non-limiting embodiments, the particulate polymer is present in an amount of at least 51 percent by weight, or at least 65 percent by weight, or at least 75 percent by weight, based on the total weight of the particulate polymer and the organic polymer binder. In further alternate non-limiting embodiments, the particulate polymer can be present in an amount of less than 95 percent by weight, or less than 90 percent by weight, or less than 85 percent by weight, based on the total weight of the particulate polymer and the organic polymer binder.

In the present invention, the polishing pad comprises particulate polymer and an organic polymer binder. A wide variety of suitable organic polymer binders are known for use herein. In a non-limiting embodiment, the organic polymer binder can be chosen from thermoplastic organic polymer binders, crosslinked organic polymer binders, organic polymer binders comprised of interpenetrating polymer networks and mixtures thereof. In a further non-limiting embodiment, the organic polymer can be chosen from polyurethane binders, polyepoxide binders, urethane-modified polyepoxide binders, and (meth)acrylic-modified polyurethane binders and mixtures thereof.

In a non-limiting embodiment, the organic polymer binder of the present invention can be formed in-situ. As used herein and the claims, the terms "in-situ preparation of the binder", "in-situ polymerization of the binder", "in-situ formation of the binder", and similar terminology refer to preparing, polymerizing and/or forming the organic polymer binder of the present invention in the presence of the particulate polymer. In a non-limiting embodiment, the molecules of an organic polymer binder precursor can react with each other to form the organic polymer binder while the precursor is in the presence of the particulate polymer. In another non-limiting embodiment, more than one organic polymer binder precursor can be used and the molecules of one precursor can react with the molecules of another precursor while in the presence of the particulate polymer to form the organic polymer binder.

The in-situ preparation of the organic polymer binder can include polymerization methods that are known to the skilled artisan. In alternate non-limiting embodiments, the polymer can be formed by a condensation reaction, a free radical initiated reaction or combinations thereof. In one embodiment, the polymer can be a polyurethane formed by the condensation of an isocyanate functional polyurethane prepolymer with a polyamine. In another embodiment, the polymer can be a polyurethane-acrylate formed by the polymerization of a urethane-diacrylate in the presence of free radical initiator. In a further embodiment, the polymer can be an interpenetrating polymer network formed by stepwise or simultaneous condensation and free radical polymerization reactions, as described previously herein.

Suitable organic polymer binder precursors for use in the present invention can be chosen from those known to skilled artisans, and can vary widely. Non-limiting examples can include monomers, prepolymers, resins and mixtures thereof. In non-limiting embodiments, the organic binder precursor can contain catalysts, crosslinking agents, curing agents, solvents, and other conventional additives that are known in the art.

In alternate non-limiting embodiments, the organic polymer binder precursor can be chosen from polyurethane binder precursors, polyepoxide binder precursors, urethane-modified polyepoxide binder precursors, (meth)acrylic-modified polyurethane binder precursors, and co-polymers and mixtures thereof In a non-limiting embodiment, the polyurethane binder precursor can be prepared from an isocyanate functional material which can comprise at least two isocyanate groups, and optionally a capped isocyanate material which can have at least two capped isocyanate groups; and a hydrogen functional material which can comprise at least two active hydrogen groups that can react with the isocyanate groups of the isocyanate functional material.

Non-limiting examples of suitable isocyanate functional materials, capped isocyanate materials, (meth)acrylate modified isocyanates, and hydrogen functional materials, that may be used to prepare the organic polyurethane binder can be chosen from the isocyanate functional materials, capped isocyanate materials, (meth)acrylate modified isocyanates, and hydrogen functional materials as described previously herein, respectively, relative to the particulate polymer.

In a further non-limiting embodiment, the isocyanate functional material can include a capped isocyanate material. It is believed that the presence of a capped isocyanate material can delay the onset of gelation when the isocyanate functional material and the hydrogen functional material are combined. Delaying the onset of gelation allows additional time for mixing together the particulate polymer and, isocyanate and hydrogen functional materials. In a further non-limiting embodiment, the capped isocyanate material can be present in an amount such that the isocyanate functional material contains capped isocyanate groups in an amount of less than 50 mole percent, or at least 5 mole percent, or from 5 mole percent to 40 mole percent, based on the total molar equivalents of free isocyanate and capped isocyanate groups.

In a non-limiting embodiment, the isocyanate functional material can comprise a (meth)acrylate-modified polyfunctional isocyanate material having at least two (meth)acrylate modified isocyanate groups, as described previously herein. In a further non-limiting embodiment, the (meth)acrylate-modified isocyanate material can be present in an amount of less than 60 weight percent, or at least 5 weight percent, or from 5 to 50 weight percent, based on the isocyanate functional material used to prepare the particulate polyurethane.

In a non-limiting embodiment, the isocyanate and hydrogen functional materials used to prepare the organic polyurethane binder precursor can comprise a catalyst. Non-limiting examples of suitable catalysts can include those recited previously herein with regard to the preparation of the particulate polyurethane, such as but not limited to tertiary amines, for example, triethylamine, and organometallic compounds, such as, dibutyltin dilaurate. In a further non-limiting embodiment, the catalyst can be incorporated into the hydrogen functional material prior to combining the isocyanate and hydrogen functional materials. In alternate non-limiting embodiments, the catalyst can be present in a amount of less than 5 percent by weight, or less than 3 percent by weight or less than 1 percent by weight, based on the total weight of the combined isocyanate and hydrogen functional materials. The molar equivalents ratio of isocyanate groups and optional capped isocyanate groups to active hydrogen groups of the materials used to prepare the crosslinked polyurethane binder can be from 0.5:1.0 to 2.0:1.0, or from 0.7:1.0 to 1.3:1.0, or from 0.8:1.0 to 1.2:1.0.

In a non-limiting embodiment of the present invention, the organic polyurethane binder can be a reaction product of an isocyanate functional material which can have at least two isocyanate groups, and water. Non-limiting examples of suitable isocyanate functional materials can include those non-limiting examples of isocyanate functional materials recited previously herein. In a further non-limiting embodiment, an isocyanate functional polyurethane prepolymer having at least two isocyanate groups can be reacted with water to form an organic polyurethane binder for use in the present invention. Non-limiting examples of suitable isocyanate functional polyurethane prepolymers include those described previously herein. In a non-limiting embodiment, the isocyanate functional polyurethane prepolymer can include but is not limited to the reaction product of toluene diisocyanate and poly(tetrahydrofuran).

As used herein and in the claims, the term "reacted with water" can include adding water to the isocyanate functional material, or it can include contacting the isocyanate functional material with water vapor, moisture or humidity.

In a non-limiting embodiment, the particulate polymer, isocyanate functional material and optional catalyst can be mixed together and placed into an open mold (e.g., a mold having no top or lid). The mixture can be distributed within the mold by mechanical means to uniformly fill the mold. Suitable mechanical means can include low pressure pressing or the use of compaction rollers. The filled open mold then can be placed in an oven at ambient temperature (for example, 25° C.) or elevated temperature (for example, from 30° C. to 90° C.) for a period of time (for example, from 30 minutes to 24 hours) in the presence of air having a percent relative humidity (for example, from 25 to 95 percent).

In a non-limiting embodiment, a polyepoxide binder precursor can be prepared by reacting an epoxide functional material which can comprise at least two epoxide groups; and a hydrogen functional material which can comprise at least two active hydrogen groups that are reactive with the epoxide groups of the epoxide functional material. Non-limiting examples of suitable epoxide and hydrogen functional materials can include those previously recited relative to those epoxide and hydrogen functional materials used to prepare the particulate polyepoxide as discussed previously herein.

Non-limiting examples of suitable epoxide and hydrogen functional materials that can be used to prepare the polyepoxide binder precursor can be chosen from the epoxide and hydrogen functional materials as described previously herein, respectively.

In a non-limiting embodiment, the epoxide and hydrogen functional materials used to prepare the polyepoxide binder precursor can comprise an epoxide ring opening catalyst. Non-limiting examples of suitable catalysts can include those epoxide catalysts recited previously herein with regard to the preparation of the particulate polyepoxide, such as tertiary amines, for example, tri-tertiarybutyl amine, and tetrafluoroboric acid. In a non-limiting embodiment, the catalyst can be added to the hydrogen functional material prior to mixing the epoxide and hydrogen materials together.

In a further non-limiting embodiment, the epoxide ring opening catalyst can be present in an amount of less than 5 percent by weight, or less than 3 percent or 1 percent by weight, based on the total weight of the epoxide and hydrogen functional materials. In alternate non-limiting embodiments, the molar equivalent ratio of epoxide groups to active hydrogen groups of the materials used to prepare the polyepoxide binder precursor can be from 0.5:1.0 to 2.0:1.0, or from 0.7:1.0 to 1.3:1.0 or from 0.8:1.0 to 1.2:1.0.

Non-limiting examples of suitable organic polymer binder precursors can comprise thermoplastic polymers. Suitable thermoplastic polymers can be chosen from a wide variety of thermoplastic polymers that are well known to the skilled artisan, and can include but are not limited to those recited previously herein relative to the thermoplastic particulate polymer, such as thermoplastic poly(meth)acrylates, thermoplastic polyurethanes and mixtures thereof.

Further non-limiting examples of suitable organic polymer binder precursors can comprise crosslinked polymers. Suitable crosslinked polymers can be chosen from a wide variety of crosslinked polymers that are well known to the skilled artisan, and can include but are not limited to those recited previously herein relative to the crosslinked particulate polymer, such as crosslinked polyurethanes, crosslinked polyepoxides, crosslinked urethane-modified epoxies and mixtures thereof.

In a non-limiting embodiment, the organic polymer binder precursor can comprise conventional additives. Non-limiting examples of suitable conventional additives include those additives as described previously herein with regard to preparation of the particulate polyurethane and particulate polyepoxide, such as but not limited to mold release agents, dyes and flexibilizing agents. In alternate non-limiting embodiments, the additives can be present in an amount totaling less than 10 percent by weight, or less than 5 percent by weight, or less than 3 percent by weight, based on the total weight of the organic polymer binder. In further alternate non-limiting embodiments, the conventional additives can be added to either the epoxide or hydrogen functional materials.

In alternate non-limiting embodiments, the polishing pad of the present invention can comprise at least 5 percent by weight, or at least 10 percent by weight, or at least 15 percent by weight of the organic polymer binder, based on the total weight of the particulate polymer and the organic polymer binder. In further alternate non-limiting embodiments, the organic polymer binder can be present in the polishing pad in an amount of less than 49 percent by weight, or less than 35 percent by weight, or less than 25 percent by weight, based on the total weight of the particulate polymer and the organic polymer binder.

The polishing pad of the present invention can be prepared by a variety of methods known to a skilled artisan. In a non-limiting embodiment, the polishing pad can be prepared by a multi-step process which includes mixing together the particulate polymer and the organic binder precursor comprising an isocyanate functional material and a hydrogen functional material. The mixture of the particulate polymer and precursor can be polymerized or cured, for example, by the application of heat, to form the polishing pad of the present invention. As stated previously herein, the polymerization of the organic polymer binder using a precursor in the presence of the particulate polymer is referred to herein and in the claims by the term "in-situ".

In a non-limiting embodiment of the present invention, the particulate polymer can comprise a thermoplastic particulate polymer; the thermoplastic particulate polymer can be mixed with the organic binder precursor, and can be polymerized or cured at a temperature that is less than the melting or sintering point of the particulate thermoplastic polymer such that there is no sintering between the thermoplastic particles of the resulting pad. In alternate non-limiting embodiments, the temperature can be less than 180° C. or less than or equal to 150° C. or less than or equal to 135° C.

In another non-limiting embodiment, the mixture of particulate polymer and the organic binder precursor can be polymerized in a mold with the application of pressure and heat, wherein the conditions result in no sintering. Upon completion of the polymerization step, the pressure under-which the mold is held can be released, the polishing pad can then be removed from the mold, and the pad can be further processed, for example, cut into various shapes.

The polishing pad of the present invention can have one or more work surfaces, wherein "work surface" as used herein and the claims refers to a surface of the pad that can come into contact with the surface of the article that is to be polished. In a non-limiting embodiment, the article to be polished can be a silicon wafer. In a non-limiting embodiment, the work surface of the polishing pad can have surface features such as but not limited to channels, grooves, perforations and combinations thereof. These surface features can enhance one or more of the following charactistics: (1) the movement of the polishing slurry between the work surface of the pad and the surface of the article that is being polished; (2) the removal and transport of abraded material away from the surface of the article that is being polished; or (3) the polishing or planarization efficency of the polishing pad.

Surface features can be incorporated into the work face of the polishing pad by means that are known to those of ordinary skill in the art. In a non-limiting embodiment, the work surface of the pad can be mechanically modified, for example, by abrading or cutting. In another non-limiting embodiment, surface features can be incorporated into the work surface of the pad during the molding process, for example, by providing at least one interior surface of the mold with raised features that can be imprinted into the work surface of the pad during its formation. Surface features can be distributed in the form of random or uniform patterns across the work surface of the polishing pad. Non-limiting examples of surface feature patterns can include but are not limited to spirals, circles, squares, cross-hatches and waffle-like patterns.

In alternate non-limiting embodiments, the polishing pad of the present invention can have a pore size of at least 1 micron, or at least 5 microns, or at least 10 microns. In further alternate non-limiting embodiments, the pore size of the polishing pad can be less than 1000 microns, or less than 500 microns, or less than 100 microns.

In a non-limiting embodiment, the particulate polymer and/or the organic polymer binder can comprise an abrasive particulate material. The abrasive particulate material can be distributed substantially uniformly or non-uniformly throughout the particulate polymer and/or the organic polymer binder. In a non-limiting embodiment, the abrasive particulate material can be distributed substantially uniformly throughout the particulate polymer and/or the organic polymer binder. In alternate non-limiting embodiments, the abrasive particulate material can be present in the polishing pad in an amount of less than 70 percent by weight, or at least 5 percent by weight, or from 5 percent to 65 percent by weight, based on the total weight of the pad.

In alternate non-limiting embodiments, the abrasive particulate material can be in the form of individual particles, aggregates of individual particles, or a combination of individual particles and aggregates. In further alternate non-limiting embodiments, the shape of the abrasive particulate material can include but is not limited to spheres, rods, triangles, pyramids, cones, regular cubes, irregular cubes, and mixtures and/or combinations thereof.

In general, the average particle size of the abrasive particulate material can vary widely. In alternate non-limiting embodiments, the average particle size can be at least 0.001 micron, or at least 0.01 micron, or at least 0.1 micron. In further alternate non-limiting embodiments, the average particle size of the abrasive particulate material can be less than 50 microns, or less than 10 microns, or less than 1 micron.

In a non-limiting embodiment, the average particle size of the abrasive particulate material can measured along the longest dimension of the particle.

Non-limiting examples of suitable abrasive particulate materials for use in the present invention can include aluminum oxide, such as but not limited to gamma alumina, fused aluminum oxide, heat treated aluminum oxide, white fused aluminum oxide, and sol gel derived alumina; silicon carbide, such as but not limited to green silicon carbide and black silicon carbide; titanium diboride; boron carbide; silicon nitride; tungsten carbide; titanium carbide; diamond; boron nitride, such as but not limited to cubic boron nitride and hexagonal boron nitride; garnet; fused alumina zirconia; silica, such as but not limited to fumed silica; iron oxide; cromia; ceria; zirconia; titania; tin oxide; manganese oxide; and mixtures thereof. In a further non-limiting embodiment, the abrasive particulate material can be chosen from aluminum oxide, silica, cerium oxide, zirconia and mixtures thereof.

In a non-limiting embodiment, the abrasive particulate material used in the present invention can have a surface modifier thereon. Non-limiting examples of suitable surface modifiers can include surfactants, coupling agents and mixtures thereof. In a non-limiting embodiment, surfactants can be used to improve the dispersibility of the abrasive particles in the resins from which the particulate polymer and/or organic polymer binder can be prepared. In another non-limiting embodiment, coupling agents can be used to enhance binding of the abrasive particles to the matrix of the particulate polymer and/or to the matrix of the organic polymer binder. In a further non-limiting embodiment, the surface modifier can be present in an amount of less than 25 percent by weight, or from 0.5 to 10 percent by weight, based on the total weight of the abrasive particulate material and surface modifier.

Non-limiting examples of suitable surfactants for use in the present invention can include anionic, cationic, amphoteric and nonionic surfactants, such as but not limited to metal alkoxides, polalkylene oxides, salts of long chain fatty carboxylic acids. Non-limiting examples of suitable coupling agents for use in the present invention can include silanes, such as but not limited to organosilanes, titanates and zircoaluminates. In a non-limiting embodiment, the coupling agent can include SILQUEST silanes A-174 and A-1230, which are commercially available from Witco Corporation.

The polishing pad of the present invention can have shapes chosen from but not limited to circles, ellipses, squares, rectangles and triangles. In a non-limiting embodiment, the polishing pad can be in the form of a continuous belt. The polishing pads according to the present invention, can have a wide range of sizes and thicknesses. In a non-limiting embodiment, a circular polishing pad can have a diameter ranging from 3.8 cm to 137 cm. In a further non-limiting embodiment, the thickness of the polishing pad can vary from 0.5 mm to 5 mm.

In a non-limiting embodiment, the polishing pad of the present invention can have a density of from 0.5 grams per cubic centimeter (g/cc) to 1.1 g/cc as measured by ASTM 1622-88. In another non-limiting embodiment, the polishing pad can have a Shore A Hardness value of at least 80, or from 85 to 98, and Shore D Hardness value of at least 35, or 85 or less, or from 45 to 80, as determined in accordance with ASTM D 2240.

In a non-limiting embodiment, the polishing pad can comprise particulate crosslinked polyurethane and polyurethane binder. In another embodiment of the present invention, the polishing pad can comprise particulate crosslinked polyepoxide and polyurethane binder. In a further non-limiting embodiment, the polishing pad can comprise particulate crosslinked polyepoxide and polyepoxide binder. In a further embodiment, the polishing pad can comprise particulate crosslinked polyurethane and polyepoxide binder. In a further embodiment, the polishing pad can comprise particulate crosslinked polyurethane, particulate crosslinked polyepoxide and mixtures thereof, and a polyurethane binder, polyepoxide binder and co-polymers thereof.

A polishing pad according to the present invention may be described with reference to drawing FIG. 3. In FIG. 3, a polishing pad 6 having a work surface 11 on one side and a substantially parallel back surface 17 on the opposite side of the pad is depicted. In FIG. 3, a portion 14 of work surface 11 is depicted in further detail in magnified view 14'. With reference to magnified view 14', polishing pad 6 comprises particulate polymer 20, which is bonded together by organic polymer binder 26. Particulate polymer 20 and organic polymer binder 26 together form surface pores 30 on work surface 11, and embedded pores 23, which reside below work surface 11.

While not intending to be bound by any theory, it is believed that while in use, while polishing or planarizing the surface of a silicon wafer, in a non-limiting embodiment, the porosity of the work surface of the polishing pad of the present invention remains substantially constant. With further reference to FIG. 1, as work surface 11 of polishing pad 6 is worn away during, for example a polishing or pad conditioning process, new surface pores 30 are formed as those embedded pores 23 residing proximately below work surface 11 are exposed.

In a non-limiting embodiment, the polishing pad of the present invention can be used without a subpad, and can be placed directly on the platen of a motorized polishing tool, machine, or apparatus. In an alternate embodiment, the polishing pad of the present invention can be included in a polishing pad assembly, wherein at least one backing sheet can be adhered to the back surface of the polishing pad. In a non-limiting embodiment, a polishing pad assembly can comprise:

(a) a polishing pad having a work surface and a back surface;
(b) a backing sheet having an upper surface and a lower surface; and
(c) an adhesive means interposed between and in contact with the back surface of said polishing pad and the upper surface of said backing sheet.

In a non-limiting embodiment, the backing sheet of the polishing pad assembly can be rigid or flexible, and can support or stabilize or cushion the polishing pad during polishing operations. The backing sheet can be fabricated from materials that are known to the skilled artisan. In alternate non-limiting embodiments, the backing sheet can be fabricated from organic polymeric materials, such as but not limited to polyesters, such as polyethylene terephthalate sheet, and polyolefins, such as polyethylene sheet and polypropylene sheet.

In another non-limiting embodiment, the backing sheet of the polishing pad assembly of the present invention can be a release sheet, which can be peeled away from the adhesive means, thereby allowing the pad to be adhered to another surface, for example, the platen of a polishing apparatus, by means of the exposed adhesive means. Release sheets are known to those of ordinary skill in art. In a non-limiting embodiment, the release sheet can be fabricated from paper or organic polymeric materials, such as but not limited to polyethylene terephthalate sheet, polyolefins, for example, polyethylene sheet and polypropylene sheet, and fluorinated polyolefins, for example, polytetrafluoroethylene. In a further non-limiting embodiment, the upper surface of the release sheet can comprise a release coating thereon that can be in contact with the adhesive means. Release coatings are well known to the skilled artisan. Non-limiting examples of release coatings can include fluorinated polymers and silicones.

The adhesive means of the polishing pad assembly can be selected from an adhesive assembly or an adhesive layer. An adhesive layer can be applied according to known methods. In a non-limiting embodiment, the adhesive layer can be applied to the back surface of the polishing pad and/or the upper surface of the backing sheet, prior to pressing the polishing pad and backing sheet together. Non-limiting examples of adhesive layers can include contact adhesives, thermoplastic adhesives, and curable adhesives, such as but not limited to thermosetting adhesives.

In another non-limiting embodiment, an adhesive assembly can comprise an adhesive support sheet interposed between an upper adhesive layer and a lower adhesive layer. The upper adhesive layer of the adhesive assembly can be in contact with the back surface of the polishing pad, and the lower adhesive layer can be in contact with the upper surface of the backing sheet. Non-limiting examples of adhesive support sheets can be fabricated from an organic polymeric material, such as but not limited to polyesters, for example, polyethylene terephthalate sheet, and polyolefins, for example, polyethylene sheet and polypropylene sheet. In a further non-limiting embodiment, the upper and lower adhesive layers of the adhesive assembly can be chosen from those adhesives as recited previously herein with regard to the adhesive layer. In a non-limiting embodiment, the upper and lower adhesive layers can each be contact adhesives. In a further non-limiting embodiment, the adhesive assembly can be a two-sided or double coated tape, such as but not limited to double coated film tapes, which can be commercially obtained from 3M, Industrial Tape and Specialties Division.

A polishing pad assembly of the present invention, can be described with reference to FIGS. 1 and 2. The polishing pad assembly 7 of FIG. 1 includes a polishing pad 33 having an upper work surface 11 and a lower back surface 17, a backing sheet 39 having an upper surface 42 and a lower surface 45, and an adhesive layer 36 which is interposed between polishing pad 33 and backing sheet 39. Adhesive layer 36 is in adhesive contact with both lower back surface 17 of polishing pad 33, and upper surface 42 of backing sheet 39.

Polishing pad assembly 9 of FIG. 2, includes an adhesive assembly 48, which is interposed between polishing pad 33 and backing sheet 39. Adhesive assembly 48 is composed of an adhesive support sheet 51, which is interposed between upper adhesive layer 54 and lower adhesive layer 57. Upper adhesive layer 54 is in contact with lower back surface 17 of polishing pad 33, and lower adhesive layer 57 is in contact with upper surface 42 of backing sheet 39. Lower surface 45 of backing sheet 39 of polishing pad assemblies 7 and 9 of FIGS. 1 and 2 may each be attached to the platen of a motorized polishing machine, not shown, by suitable means, e.g., adhesive means (not shown).

In a non-limiting embodiment, the polishing pad of the present invention can be used in combination with a polishing fluid, such as a polishing slurry, which is known in the art. During polishing, the polishing fluid can be interposed between the work surface of the pad and the surface of the substrate to be polished. In a non-limiting embodiment, the polishing steps can include moving the polishing pad relative to the substrate being polished. Non-limiting examples of suitable polishing fluids for use in the present invention can include slurries comprising abrasive particles. Non-limiting examples of suitable abrasives can include particulate cerium oxide, particulate alumina, and particulate silica. Non-limiting examples of commercial slurries for use in polishing semiconductor substrates can include ILD 1200 and ILD1300 which are commercially available from Rodel, Incorporated; and Semi-Sperse AM100 and Semi-Sperse 12 which are commercially available from Cabot Microelectronics Materials Division.

In a non-limiting embodiment, the polishing pad of the present invention can be used in combination with a sub-pad layer forming a composite or multi-layered structure. In a further non-limiting embodiment, a sub-pad layer can be used with a polishing pad to increase the uniformity of contact between the polishing pad and the surface of the substrate which is being polished. The sub-pad layer can be made of a compressible material capable of imparting even pressure to the work surface of the polishing pad. Non-limiting examples of sub-pad layers can include but are not limited to polyurethane impregnated felt, and foam sheet made of natural rubber, synthetic rubber, thermoplastic elastomer. In a non-limiting embodiment, the thickness of the sub-pad layer can be in the range of from 0.2 to 2 mm. An example of a commercially available sub-pad layer suitable for use in the present invention can include Suba™ IV, which is commercially available from Rodel, Incorporated.

The present invention is more particularly described in the following examples, which are intended to be illustrative only, since numerous modifications and variations therein will be apparent to those skilled in the art. Unless otherwise specified, all parts and all percentages are by weight.

EXAMPLES A, B, C AND D

Preparation of Particulate Crosslinked Polymers

EXAMPLE A

Particulate crosslinked polyurethane was prepared from the ingredients listed in Table A. The particulate crosslinked polyurethane was used to prepare polishing pads as described further herein in Examples 1 and 2.

TABLE A

| Ingredients | Weight (grams) |
|---|---|
| Charge 1 | |
| diamine curative (a) | 22.5 |
| diamine curative (b) | 8.8 |
| surfactant (c) | 0.1 |
| Charge 2 | |
| isocyanate functional prepolymer (d) | 68.5 |

(a) LONZACURE MCDEA diamine curative obtained from Air Products and Chemicals, Inc, which describes it as methylene bis(chlorodiethylanaline).
(b) VERSALINK P-650 poly(tetramethylene glycol) diamine curative obtained from Air Products and Chemicals, Inc.
(c) PLURONIC F108 surfactant, obtained from BASF Corporation.
(d) ARITHANE PHP-75D prepolymer, obtained from Air Products and Chemicals, Inc, which describes it as the isocyanate functional reaction product of toluene diisocyanate and poly(tetramethylene glycol).

Charge 1 was added to an open container and placed on a hot plate set at a temperature of 90° C. until the contents of the container became molten. Charge 2 was then added to the container while still on the hot plate, and the contents were thoroughly mixed with a motor driven impeller until uniform. The contents of the container were then poured slowly into 400 grams of 80° C. deionized water, with concurrently vigorous stirring of the deionized water. Upon completion of the addition of the contents of the container, vigorous mixing of the deionized water was continued for an additional 10 minutes, followed by isolation of the formed particulate crosslinked polyurethane by means of filtration. The isolated particulate crosslinked polyurethane was dried in a 130° C. oven for 2 hours.

The dried particulate crosslinked polyurethane was classified using a stack of sieves having mesh sizes from the top to the bottom of the stack of: 40 mesh (420 micron sieve openings), 50 mesh (297 micron sieve openings), 70 mesh (210 micron sieve openings) and 140 mesh (105 micron sieve openings). Particulate material was collected separately from each of the sieve screens. Particulate material collected from, for example, the 70 mesh screen was determined to have a particle size range of from about 210 to 297 microns, based on the sieve opening sizes of the 50 and 70 mesh sieves.

EXAMPLE B

Particulate crosslinked polyepoxide was prepared from the ingredients listed in Table B. The particulate crosslinked polyepoxide was used to prepare polishing pads as described further herein in Examples 3 and 4.

TABLE B

| Ingredients | Weight (grams) |
|---|---|
| Charge 1 | |
| polyamine curative (e) | 40.9 |
| surfactant (c) | 1.0 |
| isopropanol solvent | 15.8 |
| solvent (f) | 11.9 |
| Charge 2 | |
| epoxy resin (g) | 58.1 |

(e) VERSAMID 253 polyamine-polyamide curative, obtained from Cognis Corp.
(f) DOWANOL PM propylene glycol monomethyl ether, obtained from Dow Chemical.
(g) EPON 880 epoxy resin, obtained from Shell Chemical.

Charge 1 was added to an open container and stirred with a motor driven impeller at 60° C. until all of the components were visually observed to have dissolved and a uniform mixture was formed, followed by cooling to ambient room temperature (about 25° C.). Charge 2 was then added to the container, and the contents were further mixed until uniform. The contents of the container were then poured slowly into 300 grams of 80° C. deionized water, with concurrently vigorous stirring of the deionized water. Upon completion of the addition of the contents of the container, vigorous mixing of the deionized water was continued for an additional 2 hours, followed by isolation of the formed particulate crosslinked polyepoxide by means of filtration. The isolated particulate crosslinked polyepoxide was dried overnight in a 100° C. oven.

The dried particulate crosslinked polyepoxide was classified using a stack of sieves as described in Example A. Particulate crosslinked polyepoxide was collected separately from each of the sieve screens.

EXAMPLE C

Particulate crosslinked polyurethane was prepared from the ingredients listed in Table C. The particulate crosslinked polyurethane was used to prepare polishing pads as described further herein in Example 5.

TABLE C

| Ingredients | Weight (grams) |
|---|---|
| Charge 1 | |
| diamine curative (a) | 810 |
| surfactant (c) | 30.6 |
| methyl isobutyl ketone solvent | 822 |
| Charge 2 | |
| isocyanate functional prepolymer (d) | 2112 |

Charge 1 was added to an open container and warmed with stirring on a hot plate until the contents of the container reached 35° C. Stirring was continued at this temperature until the ingredients formed a homogeneous solution. The container was then removed from the hot plate. Charge 2 was warmed to 55° C. using a water bath then added to Charge 1. The contents were mixed for 3 minutes with a motor driven impeller until uniform. The contents of the container were then poured immediately into 10 Kilograms of 40° C. deionized water, with concurrently vigorous stirring of the deionized water. Upon completion of the addition of the contents of the container, vigorous mixing of the deionized water was continued for an additional 60 minutes. The wet particulate crosslinked polyurethane was classified using a stack of sieves having mesh sizes from the top to the bottom of the stack of: 50 mesh (300 micron sieve openings), and 140 mesh (105 micron sieve openings). The isolated particulate crosslinked polyurethane from the 140 mesh was dried overnight in a 80° C. oven.

EXAMPLE D

Particulate crosslinked polyurethane was prepared from the ingredients listed in Table D. The particulate crosslinked polyurethane was used to prepare polishing pads as described further herein in Example 12.

TABLE D

| Ingredients | Weight (grams) |
| --- | --- |
| Charge 1 | |
| diamine curative (a) | 1050 |
| surfactant (c) | 31.5 |
| methyl isobutyl ketone solvent | 860 |
| Charge 2 | |
| isocyanate functional prepolymer (d) | 1570 |
| aliphatic polyisocyanate (j) | 446 |

(j) DESMODUR N 3300 aliphatic polyisocyanate, obtained from Bayer Corporation, Coatings and Colorants Division, which describes it as a polyfunctional aliphatic isocyanate resin based on hexamethylene diisocyanate.

Charge 1 was added to an open container and warmed with stirring on a hot plate until the contents of the container reached 35° C. Stirring was continued at this temperature until the ingredients formed a homogeneous solution. The container was then removed from the hot plate. With stirring, Charge 2 was warmed to 55° C. using a water bath then added to Charge 1. The contents were mixed for 2 minutes with a motor driven impeller until uniform. The contents of the container were then poured immediately into 10 Kilograms of 30° C. deionized water, with concurrently vigorous stirring of the deionized water. Upon completion of the addition of the contents of the container, vigorous mixing of the deionized water was continued for an additional 30 minutes. The wet particulate crosslinked polyurethane was classified using a stack of sieves having mesh sizes from the top to the bottom of the stack of: 50 mesh (300 micron sieve openings), and 140 mesh (105 micron sieve openings). The isolated particulate crosslinked polyurethane particulate from the 140 mesh was dried overnight in a 80° C. oven.

EXAMPLES

Preparation of Polishing Pads

Example 1

A polishing pad comprising particulate crosslinked polyurethane and crosslinked polyurethane binder was prepared from the ingredients summarized in the following Table 1. Physical data of the polishing pad of Example 1 are summarized in Table 5.

TABLE 1

| Ingredients | Weight (grams) |
| --- | --- |
| Charge 1 | |
| particulate crosslinked polyurethane of Example A (h) | 5.2 |
| isocyanate functional prepolymer (d) | 1.23 |
| Charge 2 | |
| particulate crosslinked polyurethane of Example A | 2.0 |
| diamine curative (a) | 0.41 |
| diamine curative (b) | 0.16 |

(h) Particulate crosslinked polyurethane of Example A that was collected from the 70 mesh sieve screen of a series of sieves stacked top to bottom: 40 mesh, 50 mesh, 70 mesh and 140 mesh, and which was determined accordingly to have a particle size range of from 210 to 297 microns.

Charges 1 and 2 were each separately mixed by hand using a stainless steel spatula until homogenous. The homogenous mixtures of Charges 1 and 2 were then combined in a suitable container and mixed together by means of a motor driven impeller. A 6.5 gram portion of the combination of Charges 1 and 2 was then introduced into a 1.6 millimeter deep open circular mold having a diameter of 8.3 centimeters. The mold was closed and placed in a press under a downward force of 907 kilograms and a temperature of 135° C. for a period of 30 minutes. The mold was removed from the press and allowed to cool to ambient room temperature (about 25° C.), followed by demolding of the polishing pad from the mold.

Example 2

A polishing pad comprising particulate crosslinked polyurethane and crosslinked polyepoxide binder was prepared from the ingredients summarized in the following Table 2. Physical data of the polishing pad of Example 2 are summarized in Table 5.

TABLE 2

| Ingredients | Weight (grams) |
| --- | --- |
| Charge 1 | |
| epoxy resin (g) | 1.1 |
| polyamine curative (e) | 0.74 |
| isopropanol solvent | 1.9 |
| propylene glycol monomethyl ether solvent (f) | 1.44 |
| Charge 2 | |
| particulate crosslinked polyurethane of Example A (h) | 7.2 |

Charge 1 was mixed by hand in a suitable container using a stainless steel spatula until homogenous. Charge 2 was then added to the homogenous mixture of Charge 1, followed by additional mixing by means of a motor driven impeller. A 7.2 gram portion of the combination of Charges 1 and 2 was then introduced into an open circular mold as described in Example 1. The mold was closed and placed in a press under a downward force of 907 kilograms and a temperature of 120° C. for a period of 30 minutes. The mold was removed from the press and allowed to cool to ambient room temperature (about 25° C.), followed by demolding of the polishing pad from the mold. The demolded polishing pad was then given a one hour post-cure at a temperature of 120° C.

Example 3

A polishing pad comprising particulate crosslinked polyepoxide and crosslinked polyepoxide binder was prepared from the ingredients summarized in the following Table 3. Physical data of the polishing pad of Example 3 are summarized in Table 5.

TABLE 3

| Ingredients | Weight (grams) |
| --- | --- |
| Charge 1 | |
| epoxy resin (g) | 1.2 |
| polyamine curative (e) | 0.82 |
| isopropanol solvent | 2.1 |
| propylene glycol monomethyl ether solvent (f) | 1.6 |

TABLE 3-continued

| Ingredients | Weight (grams) |
|---|---|
| Charge 2 | |
| particulate crosslinked polyepoxide of Example B (i) | 7.2 |

(i) Particulate crosslinked polyepoxide of Example B that was collected from the 70 mesh sieve screen of a series of sieves stacked top to bottom: 40 mesh, 50 mesh, 70 mesh and 140 mesh, and which was determined accordingly to have a particle size range of from 210 to 297 microns.

Charge 1 was mixed by hand in a suitable container using a stainless steel spatula until homogenous. Charge 2 was then added to the homogenous mixture of Charge 1, followed by additional mixing by means of a motor driven impeller. A 7.2 gram portion of the combination of Charges 1 and 2 was then introduced into an open circular mold as described in Example 1. The mold was closed and placed in a press under a downwad force of 907 kilograms and a temperature of 120° C. for a period of 30 minutes. The mold was removed from the press and allowed to cool to ambient room temperature (about 25° C.), followed by demolding of the polishing pad from the mold. The demolded polishing pad was then given a one hour post-cure at a temperature of 120° C.

Example 4

A polishing pad comprising particulate crosslinked polyepoxide and crosslinked polyurethane binder was prepared from the ingredients summarized in the following Table 4. Physical data of the polishing pad of Example 4 are summarized in Table 5.

TABLE 4

| Ingredients | Weight (grams) |
|---|---|
| Charge 1 | |
| particulate crosslinked polyepoxide of Example B (i) | 5.0 |
| isocyanate functional prepolymer (d) | 1.5 |
| Charge 2 | |
| particulate crosslinked polyepoxide of Example B (i) | 3.3 |
| diamine curative (a) | 0.57 |
| acetone solvent | 2.0 |

Charges 1 and 2 were each separately mixed by hand using a stainless steel spatula until homogenous. The homogenous mixtures of Charges 1 and 2 were then combined in a suitable container and mixed together by means of a motor driven impeller. A 7.7 gram portion of the combination of Charges 1 and 2 was then introduced into a open circular mold as described in Example 1. The mold was closed and placed in a press under a downward force of 907 kilograms and a temperature of 120° C. for a period of 30 minutes. The mold was removed from the press and allowed to cool to ambient room temperature (about 25° C.), followed by demolding of the polishing pad from the mold. The demolded polishing pad was post-cured for one hour at a temperature of 120° C.

Example 5

A polishing pad comprising particulate crosslinked polyurethane and crosslinked polyurethane binder was prepared from the ingredients summarized in the following Table 5. Physical data of the polishing pad of Example 5 are summarized in Table 5.

TABLE 5

| Ingredients | Weight (grams) |
|---|---|
| Charge 1 | |
| particulate crosslinked polyurethane of Example C | 918 |
| Charge 2 | |
| isocyanate functional prepolymer (d) | 265 |
| aliphatic polyisocyanate (j) | 8.5 |
| additive (k) | 8.5 |
| acetone solvent | 62 |

(j) DESMODUR N 3300 aliphatic polyisocyanate, obtained from Bayer Corporation, Coatings and Colorants Division, which describes it as a polyfunctional aliphatic isocyanate resin based on hexamethylene diisocyanate.
(k) Lanco PP1362D micronized modified polypropylene wax, obtained from The Lubrizol Corporation.

Charge 2 was mixed using a motor driven stainless steel impeller until homogenous. The homogenous mixture of Charge 2 was then combined with Charge 1 in a suitable container and mixed together by means of a motor driven mixer. A 1040 gram portion of the combination of Charges 1 and 2 was then introduced onto a 26"×26" flat mold. The mold was fed through a pair of rollers at ambient temperature to form a sheet that was 0.100" thick. The sheet was cured at 25° C. and 80% RH for 18 hours followed by 130° C. for 1 hour. Circular pads with a 22.5" diameter were cut from the sheet. The upper and lower surfaces of the pad were made parallel using a milling machine.

TABLE 6

| | Polishing Pad Physical Properties | | | | |
|---|---|---|---|---|---|
| | Example 1 | Example 2 | Example 3 | Example 4 | Example 5 |
| Density (g/cm$^3$) (l) | 0.96 | 0.89 | 0.94 | 0.92 | 0.95 |
| Pore Volume (cm$^3$/g) (m) | 0.246 | 0.330 | 0.253 | 0.246 | 0.170 |
| Percent Pore Volume (n) | 23.6 | 29.4 | 23.8 | 22.6 | 16.5 |
| Average Pore Diameter (microns) (o) | 36 | 33 | 16 | 21 | 26 |
| Shore A Hardness (p) | 98 | 94 | 98 | 98 | 98 |
| Shore D Hardness (p) | 58 | 50 | 65 | 60 | 58 |

(l) Density was determined in accordance with American Standard Test Method (ASTM) D 1622–88.
(m) Pore volume was determined in accordance with ASTM D 4284–88, using an Autopore III mercury porosimeter from Micromeritics, and under the following conditions: a contact angle of 140°; a mercury surface tension of 480 dynes/cm; and degassing of the polishing pad sample under a vacuum of 50 micrometers of mercury.
(n) Percent pore volume was calculated from the following equation: 100 × (density) × (pore volume).
(o) Average pore diameter was determined using an Autopore III mercury porosimeter from Micromeritics, under the conditions as recited previously herein with regard to the determination of pore volume.
(p) Shore A and Shore D hardness were determine in accordance with ASTM D 2240–91. Shore A hardness values in excess of 80, and Shore D hardness values in excess of 35 are considered generally to be desirable.

Examples 6–9

Polishing pads comprising particulate crosslinked polyurethane and crosslinked polyurethane binder were prepared from the ingredients summarized in the following Table 7. Physical data of the polishing pads of Examples 6–9 are summarized in Table 8.

TABLE 7

| | Examples | | | |
|---|---|---|---|---|
| | 6 | 7 | 8 | 9 |
| Ingredients | Weight (grams) | | | |
| Charge 1 | | | | |
| particulate crosslinked polyurethane of Example C | 5.72 | 5.39 | 5.06 | 6.51 |
| isocyanate functional prepolymer (d) | 1.35 | 1.69 | 2.04 | 3.32 |
| acetone solvent | 1.1 | 1.1 | 1.1 | 1.2 |
| Charge 2 | | | | |
| particulate crosslinked polyurethane of Example C | 2.20 | 2.10 | 2.00 | 2.52 |
| diamine curative (a) | 0.45 | 0.56 | 0.68 | 1.11 |
| diamine curative (b) | 0.18 | 0.22 | 0.26 | 0.43 |
| acetone solvent | 1.1 | 1.1 | 1.1 | 1.2 |

Charges 1 and 2 were each separately mixed by hand using a stainless steel spatula until homogenous. The homogenous mixtures of Charges 1 and 2 were then combined in a suitable container and mixed together by means of a motor driven impeller. A portion of the combination of Charges 1 and 2 was then introduced into a 1.6 millimeter deep open circular mold having a diameter of 8.3 centimeters. The mold was closed and the contents was leveled by pressing. The filled mold was placed in an oven at 120° C. for 30 minutes. The mold was then removed from the oven and allowed to cool to ambient room temperature (about 25° C.), followed by demolding of the polishing pad from the mold. The pad was then returned to the oven at 120° C. for an additional hour to complete the cure.

TABLE 8

| Polishing Pad Physical Properties | | | | |
|---|---|---|---|---|
| | Example 6 | Example 7 | Example 8 | Example 9 |
| Density (g/cm³) (l) | 0.91 | 0.95 | 1.01 | 1.05 |
| Pore Volume (cm³/g) (m), (q) | 0.236 | 0.185 | 0.069 | 0.019 |
| Percent Pore Volume (n) | 21.5 | 17.6 | 7.0 | 2.0 |
| Average Pore Diameter (microns) (o), (q) | 32 | 22 | 27 | 56 |
| Shore D Hardness (p) | 53 | 55 | 60 | 62 |
| Percent Slurry Absorption (r) | 21.1 | 7.6 | 3.7 | 2.2 |

(q) Analysis conducted for pores having apparent diameters in the range of 8–150 microns.
(r) Percent slurry absorption was determined using the following method: 1 inch × 3 inch specimens of pad material were cut and pre-weighed to the nearest 0.001 gram. The specimens were then immersed in a container of CMP slurry (i.e., ILD 1300, Rodel, Inc., Newark, DE) maintained at a temperature of 23 +/− 1°C. for 24 hours. At the end of 24 hours the specimens were removed from the slurry, excess slurry removed from the surface, and wet specimens immediately weighed to the nearest 0.001 gram. The percent slurry absorption was calculated as follows:

$$\text{Slurry absorption, \%} = \frac{\text{wet weight} - \text{dry weight}}{\text{dry weight}} \times 100$$

Example 10

The polishing pad of Example 5 was fabricated into a polishing pad assembly by applying a double coated film tape and release liner to one surface of the polishing pad.

Example 11

A two-layer pad was constructed by mounting the polishing pad assembly of Example 6 on a 22.5" diameter polyurethane foam sheet. The release liner of the polishing pad assembly of Example 6 was removed exposing the adhesive. The polishing pad assembly was then firmly bonded, with this adhesive, to a polyurethane foam disk having a diameter of 22.5", a thickness of 1/16" and a density of 0.46 g/cm³. A double coated film tape with release liner was applied to the remaining surface of the polyurethane foam.

Example 12

A polishing pad comprising particulate crosslinked polyurethane and crosslinked polyurethane binder was prepared from the ingredients summarized in the following Table 9.

TABLE 9

| Ingredients | Weight (grams) |
|---|---|
| Charge 1 | |
| particulate crosslinked polyurethane of Example D | 2337 |
| Charge 2 | |
| isocyanate functional prepolymer (d) | 410.4 |
| aliphatic polyisocyanate (j) | 102.6 |
| catalyst (s) | 0.25 |
| acetone solvent | 120 |

(j) DESMODUR N 3300 aliphatic polyisocyanate, obtained from Bayer Corporation, Coatings and Colorants Division, which describes it as a polyfunctional aliphatic isocyanate resin based on hexamethylene diisocyanate.
(s) dibutyltin dilaurate 95%, obtained from Sigma-Aldrich Corporation.

Charge 2 was mixed using a motor driven stainless steel impeller until homogenous. The homogenous mixture of Charge 2 was then combined with Charge 1 in a suitable container and mixed together by means of a motor driven mixer until uniform. Next, a 930 gram portion of the combination of Charges 1 and 2 was introduced onto each of three 26"×26" flat molds. The molds were fed through a pair of rollers at ambient temperature to form three sheets that were 0.100" thick. The sheets were cured at 25° C. and 80% RH for 18 hours followed by 130° C. for 1 hour. Circular pads with a 22.5" diameter were cut from the sheets then the upper and lower surfaces of the pads were made parallel using a milling machine.

The present invention has been described with reference to specific details of particular embodiments thereof. It is not intended that such details be regarded as limitations upon the scope of the invention except insofar as and to the extent that they are included in the accompanying claims.

We claim:
1. A polishing pad comprising:
 (a) particulate polymer chosen from thermoplastic particulate polymer, crosslinked particulate polymer, particulate polymer comprised of interpenetrating polymer networks, and mixtures thereof; and

(b) an organic polymer binder chosen from thermoplastic organic polymer binders, crosslinked organic polymer binders, organic polymer binders comprised of interpenetrating polymer networks, and mixtures thereof.

2. The polishing pad of claim 1 wherein said particulate polymer is substantially solid.

3. The polishing pad of claim 1 wherein said particulate polymer is chosen from polyvinylchloride, polyvinylfluoride, polyethylene, polypropylene, nylon, polycarbonate, polyester, poly(meth)acrylate, polyether, polyepoxide, polyamide, polyurethane, polystyrene, polyimide, polysulfone and mixtures thereof.

4. The polishing pad of claim 1 wherein said organic polymer binder is selected from polyurethane binders, polyepoxide binders, urethane-modified polyepoxide binders, (meth)acrylic-modified polyurethane binders and mixtures thereof.

5. The polishing pad of claim 1 wherein said particulate polymer has an average particle size of from 20 microns to 500 microns.

6. The polishing pad of claim 1 wherein said particulate polymer is present in said polishing pad in a major amount, and said organic polymer binder is present in said polishing pad in a minor amount.

7. The polishing pad of claim 1 wherein said polishing pad has an average pore size of from 1 to 1000 microns.

8. The polishing pad of claim 1 wherein said particulate polymer and said organic polymer binder are distributed substantially uniformly across working surface of said pad, and said pad has a percent pore volume of from 2 percent by volume to 50 percent by volume, based on the total volume of said polishing pad.

9. The polishing pad of claim 1 wherein said organic polymer binder is prepared in-situ.

10. The polishing pad of claim 9 wherein said in-situ preparation comprises an organic polymer binder precursor.

11. The polishing pad of claim 10 wherein said organic polymer binder precursor is chosen from polyurethane binder precursors, polyepoxide binder precursors, urethane-modified polyepoxide binder precursors, (meth)acrylic-modified polyurethane binder precursors and mixtures thereof.

12. The polishing pad of claim 1 wherein said polishing pad has a work surface, said work surface having surface features selected from channels, grooves, perforations and combinations thereof.

13. The polishing pad of claim 1 wherein at least one of said particulate polymer and said organic polymer binder further comprises an abrasive particulate material.

14. The polishing pad of claim 13 wherein said abrasive particulate material is selected from aluminum oxide, silicon carbide, titanium diboride, boron carbide, silicon nitride, tungsten carbide, titanium carbide, diamond, boron nitride, garnet, fused alumina zirconia, silica, iron oxide, chromia, ceria, zirconia, titania, tin oxide, manganese oxide and mixtures thereof.

15. The polishing pad of claim 1 wherein said pad absorbs from 2% to 50% by volume of slurry based on the total volume of the pad.

16. A polishing pad comprising:
(a) particulate polymer chosen from thermoplastic particulate polymer, crosslinked particulate polymer, particulate polymer comprised of interpenetrating polymer networks and mixtures thereof; and
(b) organic polymer binder chosen from thermoplastic organic polymer binders, crosslinked organic polymer binders, interpenetrating polymer networks and combinations thereof,
wherein said organic polymer binder is formed in-situ.

17. The polishing pad of claim 16 wherein said particulate polymer is chosen from polyvinylchloride, polyvinylfluoride, polyethylene, polypropylene, nylon, polycarbonate, polyester, poly(meth)acrylate, polyether, polyamide, polyurethane, polystyrene, polyimide, polysulfone and mixtures thereof.

18. The polishing pad of claim 16 wherein said particulate polymer has an average particle size of from 20 microns to 500 microns.

19. The polishing pad of claim 16 wherein said organic polymer binder is selected from polyurethane binders, polyepoxide binders, urethane-modified polyepoxide binders, and (meth)acrylic-modified polyurethane.

20. The polishing pad of claim 16 wherein said particulate polymer is present in said polishing pad in an amount of from 51 percent by weight to 95 percent by weight, based on the total weight of said particulate polymer and said organic polymer binder; and said organic polymer binder is present in said polishing pad in an amount of from 5 percent by weight to 49 percent by weight, based on the total weight of said particulate polymer and said organic polymer binder.

21. The polishing pad of claim 16 wherein said polishing pad has an average pore size of from 1 to 1000 microns.

22. The polishing pad of claim 16 wherein said pad has a work surface and wherein said particulate polymer and said organic polymer binder are distributed substantially uniformly across said work surface of said pad, and said pad has a percent pore volume of from 2 percent by volume to 50 percent by volume, based on the total volume of said polishing pad.

23. The polishing pad of claim 16 wherein said organic polymer binder is prepared in-situ.

24. The polishing pad of claim 23 wherein said in-situ preparation comprises an organic polymer binder precursor.

25. The polishing pad of claim 24 wherein said organic polymer binder precursor is chosen from polyurethane binder precursors, polyepoxide binder precursors, urethane-modified polyepoxide binder precursors, (meth)acrylic-modified polyurethane binder precursors and mixtures thereof.

26. The polishing pad of claim 16 wherein said polishing pad has a work surface, said work surface having surface features selected from channels, grooves, perforations and combinations thereof.

27. The polishing pad of claim 16 wherein at least one of said particulate polymer and said organic polymer binder further comprises an abrasive particulate material.

28. The polishing pad of claim 27 wherein said abrasive particulate material is selected from aluminum oxide, silicon carbide, titanium diboride, boron carbide, silicon nitride, tungsten carbide, titanium carbide, diamond, boron nitride, garnet, fused alumina zirconia, silica, iron oxide, chromia, ceria, zirconia, titania, tin oxide, manganese oxide and mixtures thereof.

* * * * *